US010096168B2

(12) United States Patent
Da Veiga et al.

(10) Patent No.: US 10,096,168 B2
(45) Date of Patent: *Oct. 9, 2018

(54) THREE-DIMENSIONAL MIXED-REALITY VIEWPORT

(71) Applicant: MICROSOFT TECHNOLOGY LICENSING, LLC, Redmond, WA (US)

(72) Inventors: Alexandre Da Veiga, Bellevue, WA (US); Ben Sugden, Redmond, WA (US); Jon Christen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,047

(22) Filed: Dec. 13, 2017

(65) Prior Publication Data

US 2018/0101994 A1 Apr. 12, 2018

Related U.S. Application Data

(63) Continuation of application No. 14/688,817, filed on Apr. 16, 2015, now Pat. No. 9,858,720.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC .......... G02B 5/32; G03H 2210/30; H04N 5/89
See application file for complete search history.

(56) References Cited

U.S. PATENT DOCUMENTS 5,748,189 A 5/1998 Trueblood
5,819,206 A 10/1998 Horton et al.
(Continued)

FOREIGN PATENT DOCUMENTS

CN 101540020 B 9/2012
CN 103761085 A 4/2014
(Continued)

OTHER PUBLICATIONS

Steinicke, et al., "Natural Perspective Projections for Head-Mounted Displays", In Proceedings of IEEE Transactions on Visualization and Computer Graphics, vol. 17, Issue 7, Jul. 2011, pp. 888-899.
(Continued)

*Primary Examiner* — Haixia Du
(74) *Attorney, Agent, or Firm* — Mark K. Young; Mayer & Williams PC

(57) ABSTRACT

An application running on a computing platform that employs three-dimensional (3D) modeling is extended using a virtual viewport into which 3D holograms are rendered by a mixed-reality head mounted display (HMD) device. The HMD device user can position the viewport to be rendered next to a real world 2D monitor and use it as a natural extension of the 3D modeling application. For example, the user can interact with modeled objects in mixed-reality and move objects between the monitor and the viewport. The 3D modeling application and HMD device are configured to exchange scene data for modeled objects (such as geometry, lighting, rotation, scale) and user interface parameters (such as mouse and keyboard inputs). The HMD device implements head tracking to determine where the user is looking
(Continued)

so that user inputs are appropriately directed to the monitor or viewport.

20 Claims, 20 Drawing Sheets

Related U.S. Application Data

(60) Provisional application No. 62/029,351, filed on Jul. 25, 2014.

(51) Int. Cl.

| | | |
|---|---|---|
| G06F 3/01 | (2006.01) | |
| G06F 3/0481 | (2013.01) | |
| G06F 3/0484 | (2013.01) | |
| G06F 3/0486 | (2013.01) | |
| G09B 23/04 | (2006.01) | |
| H04N 13/344 | (2018.01) | |
| H04N 13/383 | (2018.01) | |
| G02B 27/00 | (2006.01) | |
| G03H 1/22 | (2006.01) | |
| H04N 13/204 | (2018.01) | |
| H04N 13/04 | (2006.01) | |
| H04N 13/02 | (2006.01) | |

(52) U.S. Cl.
CPC .............. *G06F 3/011* (2013.01); *G06F 3/012* (2013.01); *G06F 3/013* (2013.01); *G06F 3/0481* (2013.01); *G06F 3/0484* (2013.01); *G06F 3/0486* (2013.01); *G06F 3/04812* (2013.01); *G06F 3/04815* (2013.01); *G06T 19/003* (2013.01); *G09B 23/04* (2013.01); *H04N 13/044* (2013.01); *H04N 13/0484* (2013.01); *H04N 13/344* (2018.05); *H04N 13/383* (2018.05); *G02B 27/0093* (2013.01); *G02B 2027/014* (2013.01); *G02B 2027/0138* (2013.01); *G02B 2027/0174* (2013.01); *G02B 2027/0178* (2013.01); *G02B 2027/0187* (2013.01); *G03H 1/2294* (2013.01); *H04N 13/0203* (2013.01); *H04N 13/204* (2018.05)

(56) References Cited

U.S. PATENT DOCUMENTS

| | | | |
|---|---|---|---|
| 5,877,748 | A | 3/1999 | Redlich |
| 6,012,926 | A | 1/2000 | Hodges et al. |
| 6,023,275 | A | 2/2000 | Horvitz et al. |
| 6,329,986 | B1 | 12/2001 | Cheng |
| 6,396,495 | B1 | 5/2002 | Parghi et al. |
| 6,396,497 | B1 | 5/2002 | Reichlen |
| 6,529,331 | B2 | 3/2003 | Massof et al. |
| 6,552,698 | B1 | 4/2003 | Walker et al. |
| 6,741,241 | B1 | 5/2004 | Jaubert et al. |
| 6,804,607 | B1 | 10/2004 | Wood |
| 6,898,266 | B2 | 5/2005 | Griffith |
| 7,274,380 | B2 | 9/2007 | Navab et al. |
| 7,386,799 | B1 | 6/2008 | Clanton et al. |
| 7,400,322 | B1 | 7/2008 | Urbach |
| 7,486,817 | B2 | 2/2009 | Yanagawa et al. |
| 7,538,775 | B2 | 5/2009 | Ishihara |
| 7,542,210 | B2 | 6/2009 | Chirieleison, Sr. |
| 7,557,774 | B2 | 7/2009 | Baudisch et al. |
| 8,049,750 | B2 | 11/2011 | Gloudemans et al. |
| 8,266,536 | B2 | 9/2012 | Roberts et al. |
| 8,405,680 | B1 | 3/2013 | Cardoso et al. |
| 8,576,247 | B2 | 11/2013 | Avkarogullari et al. |
| 8,611,015 | B2 | 12/2013 | Wheeler et al. |
| 8,751,969 | B2 | 6/2014 | Matsuda et al. |
| 8,754,931 | B2 | 6/2014 | Gassel et al. |
| 8,780,014 | B2 | 7/2014 | Border et al. |
| 8,793,620 | B2 | 7/2014 | Stafford |
| 9,372,345 | B2 | 6/2016 | Fujimaki |
| 9,443,352 | B1 | 9/2016 | Glover et al. |
| 2001/0035845 | A1 | 11/2001 | Zwern |
| 2002/0044152 | A1 | 4/2002 | Abbott, III et al. |
| 2002/0154214 | A1 | 10/2002 | Scallie et al. |
| 2002/0181115 | A1 | 12/2002 | Massof et al. |
| 2003/0091226 | A1 | 5/2003 | Cahill et al. |
| 2005/0024388 | A1 | 2/2005 | Takemoto |
| 2005/0143887 | A1 | 6/2005 | Kinoshita |
| 2005/0179703 | A1 | 8/2005 | Johnson |
| 2006/0050070 | A1 | 3/2006 | Matsui |
| 2006/0092178 | A1 | 5/2006 | Tanguay et al. |
| 2006/0095207 | A1 | 5/2006 | Reid |
| 2006/0241827 | A1 | 10/2006 | Fukuchi et al. |
| 2006/0284792 | A1* | 12/2006 | Foxlin ............... G02B 27/017 345/8 |
| 2007/0057946 | A1 | 3/2007 | Albeck et al. |
| 2007/0116326 | A1 | 5/2007 | Aonuma et al. |
| 2007/0132662 | A1 | 6/2007 | Morita |
| 2008/0174659 | A1 | 7/2008 | McDowall |
| 2008/0195315 | A1 | 8/2008 | Hu et al. |
| 2008/0284864 | A1 | 11/2008 | Kotake et al. |
| 2009/0160985 | A1 | 6/2009 | Javidi et al. |
| 2009/0167785 | A1 | 7/2009 | Wong |
| 2009/0189974 | A1 | 7/2009 | Deering |
| 2009/0199275 | A1 | 8/2009 | Brock et al. |
| 2009/0325699 | A1 | 12/2009 | Delgiannidis |
| 2010/0208035 | A1 | 8/2010 | Pinault et al. |
| 2010/0208057 | A1 | 8/2010 | Meier et al. |
| 2010/0226017 | A1 | 9/2010 | Spaller |
| 2010/0315413 | A1 | 12/2010 | Izadi et al. |
| 2011/0029903 | A1 | 2/2011 | Schooleman et al. |
| 2011/0043627 | A1 | 2/2011 | Werling et al. |
| 2011/0140994 | A1 | 6/2011 | Noma |
| 2012/0011445 | A1 | 1/2012 | Gilboa |
| 2012/0052917 | A1 | 3/2012 | Kim |
| 2012/0056876 | A1 | 3/2012 | Lee et al. |
| 2012/0068913 | A1 | 3/2012 | Bar-Zeev et al. |
| 2012/0092328 | A1 | 4/2012 | Flaks et al. |
| 2012/0113092 | A1 | 5/2012 | Bar-Zeev et al. |
| 2012/0195471 | A1 | 8/2012 | Newcombe et al. |
| 2012/0237116 | A1 | 9/2012 | Xiao |
| 2012/0249741 | A1 | 10/2012 | Maciocci et al. |
| 2012/0309522 | A1 | 12/2012 | Westlund et al. |
| 2012/0313839 | A1 | 12/2012 | Smithwick et al. |
| 2012/0327116 | A1 | 12/2012 | Liu et al. |
| 2013/0044128 | A1 | 2/2013 | Liu et al. |
| 2013/0050258 | A1 | 2/2013 | Liu et al. |
| 2013/0050432 | A1 | 2/2013 | Perez et al. |
| 2013/0083007 | A1 | 4/2013 | Geisner et al. |
| 2013/0083018 | A1 | 4/2013 | Geisner et al. |
| 2013/0088413 | A1 | 4/2013 | Raffle et al. |
| 2013/0093789 | A1 | 4/2013 | Liu et al. |
| 2013/0127860 | A1 | 5/2013 | Hadap et al. |
| 2013/0127980 | A1 | 5/2013 | Haddick et al. |
| 2013/0137076 | A1 | 5/2013 | Perez et al. |
| 2013/0141419 | A1 | 6/2013 | Mount et al. |
| 2013/0147686 | A1 | 6/2013 | Calvin et al. |
| 2013/0194259 | A1 | 8/2013 | Bennett et al. |
| 2013/0222589 | A1 | 8/2013 | Lalonde et al. |
| 2013/0222647 | A1 | 8/2013 | Ishihara et al. |
| 2013/0257751 | A1 | 10/2013 | Stafford |
| 2013/0257899 | A1 | 10/2013 | Baron et al. |
| 2013/0287290 | A1 | 10/2013 | Owechko |
| 2013/0300637 | A1 | 11/2013 | Smits et al. |
| 2013/0307855 | A1 | 11/2013 | Lamb et al. |
| 2013/0326364 | A1 | 12/2013 | Latta et al. |
| 2013/0328927 | A1 | 12/2013 | Mount et al. |
| 2013/0335301 | A1 | 12/2013 | Wong et al. |
| 2013/0335303 | A1 | 12/2013 | Maciocci et al. |
| 2013/0336629 | A1 | 12/2013 | Mulholland et al. |
| 2013/0342564 | A1 | 12/2013 | Kinnebrew et al. |
| 2013/0342570 | A1 | 12/2013 | Kinnebrew et al. |
| 2014/0002444 | A1 | 1/2014 | Bennett et al. |
| 2014/0019874 | A1 | 1/2014 | Li et al. |
| 2014/0049559 | A1 | 2/2014 | Fleck et al. |
| 2014/0098009 | A1 | 4/2014 | Prest et al. |
| 2014/0104142 | A1 | 4/2014 | Bickerstaff et al. |

(56) References Cited

U.S. PATENT DOCUMENTS

| | | |
|---|---|---|
| 2014/0125557 A1 | 5/2014 | Issayeva |
| 2014/0130041 A1 | 5/2014 | Luxenberg et al. |
| 2014/0132484 A1 | 5/2014 | Pandey et al. |
| 2014/0132715 A1 | 5/2014 | Raghoebardayal et al. |
| 2014/0139639 A1 | 5/2014 | Wagner et al. |
| 2014/0140579 A1 | 5/2014 | Takemoto |
| 2014/0145988 A1 | 5/2014 | Ishizawa |
| 2014/0168264 A1 | 6/2014 | Harrison et al. |
| 2014/0176530 A1 | 6/2014 | Pathre |
| 2014/0184550 A1 | 7/2014 | Hennessey et al. |
| 2014/0204117 A1 | 7/2014 | Kinnebrew et al. |
| 2014/0221090 A1 | 8/2014 | Mutschler et al. |
| 2014/0240351 A1 | 8/2014 | Scavezze et al. |
| 2014/0253605 A1 | 9/2014 | Border et al. |
| 2014/0267400 A1 | 9/2014 | Mabbutt et al. |
| 2014/0317555 A1 | 10/2014 | Choi |
| 2014/0363073 A1 | 12/2014 | Shirakyan et al. |
| 2014/0372957 A1 | 12/2014 | Keane et al. |
| 2015/0091780 A1 | 4/2015 | Lyren |
| 2015/0138239 A1 | 5/2015 | Kim |
| 2015/0143459 A1 | 5/2015 | Molnar et al. |
| 2015/0145887 A1 | 5/2015 | Forutanpour |
| 2015/0153833 A1 | 6/2015 | Pinault et al. |
| 2015/0178956 A1 | 6/2015 | Davis et al. |
| 2015/0186016 A1 | 7/2015 | Li |
| 2015/0205106 A1 | 7/2015 | Norden |
| 2015/0243078 A1 | 8/2015 | Watson et al. |
| 2015/0261293 A1 | 9/2015 | Wilairat et al. |
| 2015/0325176 A1 | 11/2015 | Koyama |
| 2015/0355709 A1 | 12/2015 | Lee |
| 2015/0356788 A1 | 12/2015 | Abe et al. |

FOREIGN PATENT DOCUMENTS

| | | |
|---|---|---|
| EP | 1521482 A2 | 4/2005 |
| EP | 2164045 A2 | 3/2010 |
| JP | 2013-238693 A | 11/2013 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

Steptoe, et al., "Eye Tracking for Avatar Eye Gaze Control during Object-Focused Multiparty Interaction in Immersive Collaborative Virtual Environments", In Proceedings of IEEE Virtual Reality Conference (VR), Mar. 14, 2009, 8 Pages.

Suma, et al., "Sharing Space in Mixed and Virtual Reality Environments Using a Low-Cost Depth Sensor", In Proceedings of IEEE International Symposium on VR Innovation, Mar. 19, 2011, pp. 353-354.

Urban, John, "Five Free Tools for Multi-Monitor Computer Set-Ups", Retrieved from <<http://sixrevisions.com/tools/five-free-tools-for-multi-monitor-computer-set-ups/>>, Sep. 16, 2009, 17 Pages.

Peterson, et al., "Evaluation of Alternative Label Placement Techniques in Dynamic Virtual Environments", In Proceedings of the 10th International Symposium on Smart Graphics, May 22, 2009, 7 Pages.

Pierce, et al., "Image Plane Interaction Techniques in 3D Immersive Environments", In Proceedings of the Symposium on Interactive 3D Graphics, Apr. 30, 1997, 10 Pages.

"Touchscreen interface for seamless data transfer between the real and virtual worlds", Retrieved from <<https://web.archive.org/web/20130418052838/http://www.diginfo.tv/v/13-0025-r-en.php>>, Apr. 15, 2013, 8 Pages.

"Virtual Reality (VR) and Mixed Reality (MR) technologies", Retrieved from <<http://www.vr-hyperspace.eu/about-vr-hyperspace/technology/77-virtual-reality-vr-and-mixed-reality-mr-technologies>>Retrieved Date: Sep. 12, 2014, 5 Pages.

"Non Final Office Action Issued in U.S. Appl. No. 14/611,447", dated Dec. 27, 2016, 20 Pages.

"Notice of Allowance Issued in U.S. Appl. No. 14/611,447", dated Aug. 16, 2017, 2 Pages.

"Notice of Allowance Issued in U.S. Appl. No. 14/611,447", dated May 16, 2017, 5 Pages.

Amar, et al., "Synthesizing Reality for Realistic Physical Behavior of Virtual Objects in Augmented Reality Applications for Smart-Phones", In Proceedings of IEEE Virtual Reality (VR), Mar. 18, 2013, pp. 123-124.

Angley, Natalie, "Glasses to make you a real-life Tony Stark", Retrieved from <<http://edition.cnn.com/2013/10/31/tech/innovation/meta-augmented-reality-glasses/>>, Oct. 31, 2013, 4 Pages.

Bo, Howe, "Holographic Computer Monitor", Retrieved from <<www.youtube.com/watch?v=tHlxj7fY-38>>, Mar. 30, 2008, 2 Pages.

Chen, Jian, "A Virtual Environment System for the Comparative Study of Dome and HMD", In Master Thesis, Department of Computer Science, University of Houston, May, 2002, 104 Pages.

Duchowski, Andrew, "Chapter 7—Head-Mounted System Software Development", In Book Eye Tracking Methodology, Theory and Practice, Part 2, Jan. 1, 2007, pp. 69-86.

Gemmell, et al., "Gaze Awareness for Videoconferencing: A Software Approach", In Journal of IEEE Multi Media, vol. 7, Issue 4, Oct. 1, 2000, pp. 26-35.

Hiner, Jason, "Future iPhone concept: Laser keyboard and holographic display", Retrieved from <<http://www.techrepublic.com/blog/tech-sanity-check/future-iphone-concept-laser-keyboard-and-holographic-display/>>, Aug. 31, 2011, 6 Pages.

Hogue, Dave, "What Are Index and Alpha Transparency?", Retrieved from <<http://www.idux.com/2011/02/27/what-are-index-and-alpha-transparency/>>, Feb. 27, 2011, 14 Pages.

Jimenez, et al., "Gaze-based Interaction for Virtual Environments", In Journal of Universal Computer Science, vol. 14, Issue 19, Nov. 1, 2008, pp. 3085-3098.

Kalkofen, et al., "Visualization Techniques for Augmented Reality", In Handbook of Augmented Reality, Published by Springer New York, Jul. 13, 2011, pp. 65-98.

Kim, et al., "3D Reconstruction of Stereo Images for Interaction between Real and Virtual Worlds", In Proceedings of the 2nd IEEE/ACM International Symposium on Mixed and Augmented Reality, Oct. 7, 2003, 9 Pages.

Kinoshita, et al., "A Fast and Robust 30 Head Pose and Gaze Estimation System", In Proceedings of the 8th International Conference on Automatic Face & Gesture Recognition, Nov. 2, 2006, 2 Pages.

Kuhl, et al., "HMD Calibration and its Effects on Distance Judgments", In Proceedings of the 5th Symposium on Applied Perception in Graphics and Visualization, Aug. 9, 2008, 24 Pages.

Lavoie, et al., "Constructing 3D Virtual Reality Objects from 2D Images of Real Objects Using NURBS", In Proceedings of IEEE Symposium on Virtual Environments, Human-Computer Interfaces and Measurement Systems, Jun. 25, 2007, pp. 117-124.

Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 Pages.

Li et al. "The Underestimation of Egocentric Distance: Evidence from Frontal Matching Tasks", In Proceedings of Attention, Perception, & Psychophysics, vol. 73, Issue 7, Oct. 1, 2011, 15 Pages.

Lzadi, et al., "Kinectfusion Real-Time 3d Reconstruction and Interaction Using a Moving Depth Camera", In Proceedings of the 24th Annual ACM Symposium on User Interface Software and Technology, Oct. 16, 2011, 10 Pages.

Maimone, et al., "Computational Augmented Reality Eyeglasses", In Proceedings of IEEE International Symposium on Mixed and Augmented Reality (ISMAR), Oct. 1, 2013, 10 Pages.

McCarthy, Mike, "HP intros new Versions of its Mobile and Tower Workstations", Retrieved from <<http://postperspective.com/hp-intros-new-versions-pro-offerings/>>, Sep. 8, 2014, 5 Pages.

Murray, et al., "Comparison of Head Gaze and Head and Eye Gaze within an Immersive Environment", In Proceedings of Tenth IEEE

(56) References Cited

OTHER PUBLICATIONS

International Symposium on Distributed Simulation and Real-Time Applications, Oct. 2, 2006, 7 Pages.
Nakashima, et al., "A 2D-3D Integrated Environment for Cooperative Work", In Proceedings of the ACM symposium on Virtual reality software and technology, Nov. 7, 2005, pp. 16-22.
Nilsen, et al., "Tankwar—Tabletop War Gaming in Augmented Reality", In 2nd International Workshop on Pervasive Gaming Applications, PerGames, vol. 5, 2005, 5 Pages.
Nóbrega, et al., "Magnetic Augmented Reality: Virtual Objects in Your Space", In Proceedings of the International Working Conference on Advanced Visual Interfaces, May 21, 2012, pp. 332-335.
"International Preliminary Report on Patentability Issued in PCT Application No. PCT/US2015/041861", dated Oct. 13, 2016, 7 Pages.
"International Search Report and Written Opinion Issued in PCT Application No. PCT/US2015/041861", dated Oct. 30, 2015, 11 Pages.
"Second Written Opinion Issued in PCT Application No. PCT/US2015/041861", dated Jun. 20, 2016, 6 Pages.
"International Preliminary Report on Patentability Issued in PCT Application No. PCT/US2015/041862", dated Oct. 13, 2016, 6 Pages.
"International Search Report & Written Opinion Issued in PCT Application No. PCT/US2015/041862", dated Nov. 16, 2015, 11 Pages.
"Second Written Opinion Issued in PCT Application No. PCT/US2015/041862", dated Jun. 13, 2016, 5 Pages.
"International Preliminary Report on Patentability Issued in PCT Application No. PCT/US2015/041863", dated Oct. 13, 2016, 8 Pages.
"International Search Report & Written Opinion Received for PCT Application No. PCT/US2015/041863", dated Nov. 16, 2015, 12 Pages.
"Second Written Opinion Issued in PCT Application No. PCT/US2015/041863", dated Jun. 15, 2016, 7 Pages.
"International Search Report and Written Opinion Issued in PCT Application No. PCT/US2015/041864", dated Oct. 26, 2015, 11 Pages.
"International Preliminary Report on Patentability Issued in PCT Application No. PCT/US2015/041865", dated Oct. 19, 2016, 8 Pages.
"Second Written Opinion Issued in PCT Application No. PCT/US2015/041865", dated Jun. 15, 2016, 8 Pages.
"International Preliminary Report on Patentability Issued in PCT Application No. PCT/US2015/041866", dated Oct. 27, 2016, 9 Pages.
"International Search Report & Written Opinion Issued in PCT Application No. PCT/US2015/041866", dated Nov. 27, 2015, 12 Pages.
"Second Written Opinion Issued in PCT Application No. PCT/US2015/041866", dated Jun. 27, 2016, 7 Pages.
"International Search Report and Written Opinion Issued in PCT Application No. PCT/US2015/041867", dated Nov. 25, 2015, 11 Pages.
"International Preliminary Report on Patentability Issued in PCT Application No. PCT/US2015/041868", dated Oct. 13, 2016, 8 Pages.
"Second Written Opinion Issued in PCT Application No. PCT/US2015/041868", dated Jul. 1, 2016, 6 Pages.
"International Search Report and the Written Opinion Issued in PCT Application No. PCT/US2015/041865", dated Jan. 25, 2016, 12 Pages.
"International Search Report and the Written Opinion Issued in PCT Application No. PCT/US2015/041868", dated Oct. 28, 2015, 10 Pages.
Ponto, et al. "Perceptual Calibration for Immersive Display Environments", In Proceedings of IEEE Transactions on Visualization and Computer Graphics, vol. 19, Issue 4, Apr. 2013, pp. 691-700.
Regenbrecht, et al., "Interaction in a Collaborative Augmented Reality Environment", In Proceedings of Extended Abstracts on Human Factors in Computing Systems, Apr. 20, 2002, pp. 504-505.
"Non Final Office Action Issued in U.S. Appl. No. 14/600,774", dated Mar. 24, 2017, 29 Pages.
"Notice of Allowance Issued in U.S. Appl. No. 14/612,850", dated Oct. 12, 2017, 9 Pages.
"Final Office Action Issued in U.S. Appl. No. 14/628,539", dated Jan. 22, 2018, 29 Pages.
"Final Office Action Issued in U.S. Appl. No. 14/628,539", dated Apr. 7, 2017, 20 Pages.
"Non-Final Office Action Issued in U.S. Appl. No. 15/679,997", dated Oct. 19, 2017, 17 Pages.
"Non-Final Office Action Issued in U.S. Appl. No. 14/628,539", dated Nov. 17, 2016, 17 Pages.
"Non-Final Office Action Issued in U.S. Appl. No. 14/628,539", dated Sep. 14, 2017, 24 Pages.
"Final Office Action Issued in U.S. Appl. No. 14/688,817", dated Dec. 22, 2016, 56 Pages.
"Non Final Office Action Issued in U.S. Appl. No. 14/688,817", dated Mar. 23, 2017, 57 Pages.
"Non Final Office Action Issued in U.S. Appl. No. 14/688,817", dated Aug. 4, 2016, 50 Pages.
"Final Office Action Issued in U.S. Appl. No. 14/722,942", dated Nov. 24, 2017, 14 Pages.
"Final Office Action Issued in U.S. Appl. No. 14/723,065", dated Dec. 21, 2017, 42 Pages.
"Final Office Action Issued in U.S. Appl. No. 14/723,065", datd Feb. 7, 2017, 37 Pages.
"Non Final Office Action Issued in U.S. Appl. No. 14/723,065", dated Sep. 26, 2016, 29 Pages.
"Non Final Office Action Issued in U.S. Appl. No. 14/723,065", dated Jul. 24, 2017, 38 Pages.
"Non Final Office Action issued in U.S. Appl. No. 14/628,539", dated Jun. 27, 2018, 29 Pages.
"Final Office Action Issued in U.S. Appl. No. 14/697,109", dated May 17, 2018, 23 Pages.
"Non Final Office Action Issued in U.S. Appl. No. 14/600,774", dated May 17, 2018, 35 Pages.
"Final Office Action Issued in U.S. Appl. No. 14/723,065", dated May 2, 2018, 41 Pages.

* cited by examiner

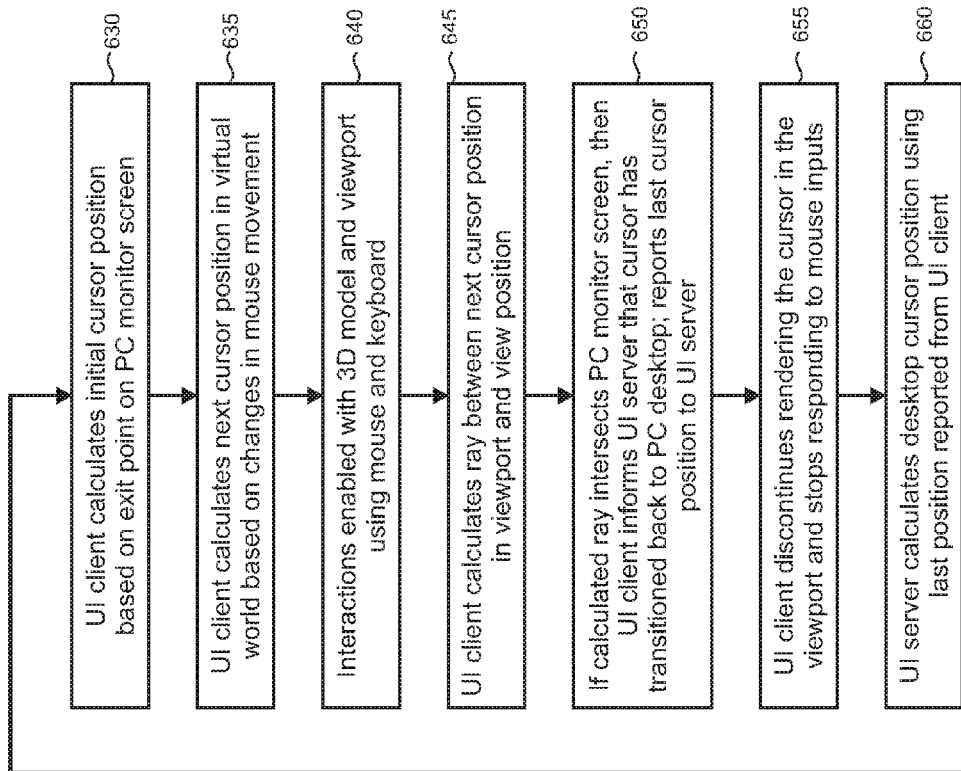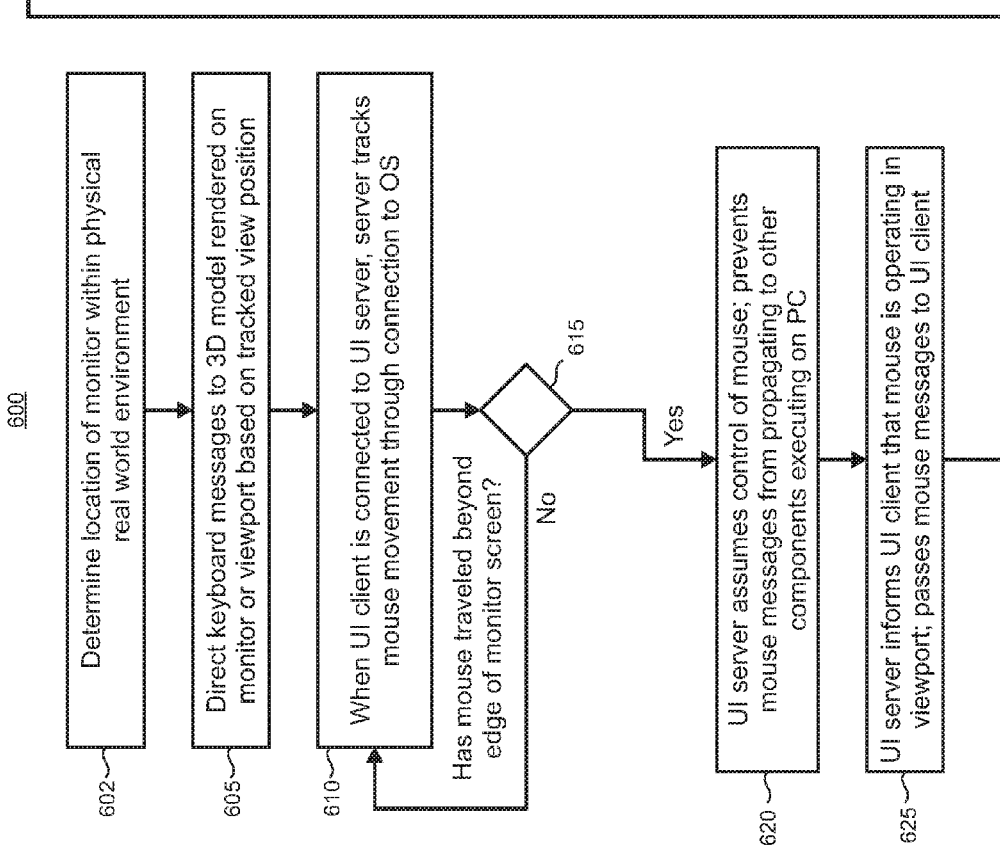
FIG 6

THREE-DIMENSIONAL MIXED-REALITY VIEWPORT

STATEMENT OF RELATED APPLICATIONS

This application is a continuation of U.S. application Ser. No. 14/688,817, filed Apr. 16, 2015, entitled, "THREE-DIMENSIONAL MIXED-REALITY VIEWPORT", which claims benefit and priority to U.S. Provisional Application Ser. No. 62/029,351 filed Jul. 25, 2014, entitled "Head Mounted Display Experiences" which are incorporated herein by reference in their entirety.

BACKGROUND

Mixed reality computing devices, such as head mounted display (HMD) systems and handheld mobile devices (e.g. smart phones, tablet computers, etc.), may be configured to display information to a user about virtual and/or real objects in the field of view of the user and/or a field of view of a camera of the device. For example, an HMD device may be configured to display, using a see-through display system, virtual environments with real world objects mixed in, or real world environments with virtual objects mixed in. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An application running on a computing platform that employs three-dimensional (3D) modeling is extended using a virtual viewport into which 3D holograms are rendered by a mixed-reality head mounted display (HMD) device. The HMD device user can position the viewport to be rendered next to a real world 2D monitor and use it as a natural extension of the 3D modeling application. For example, the user can interact with modeled objects in mixed-reality and move objects between the monitor and the viewport. The 3D modeling application and HMD device are configured to exchange scene data for modeled objects (such as geometry, lighting, rotation, and scale) and user interface data (such as mouse and keyboard inputs). The HMD device implements head tracking to determine where the user is looking so that user inputs are appropriately directed to the monitor or viewport.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 6 shows an illustrative method that may be performed by the PC and HMD device shown in FIG. 5;

Like reference numerals indicate like elements in the drawings. Elements are not drawn to scale unless otherwise indicated.

DETAILED DESCRIPTION 3D models can be generated by applications for a variety of purposes such as CAD (computer-assisted design), CAM (computer-assisted manufacturing), animation, and gaming. 3D models can often be large and complex and users are generally only able to view and work with them through limited 2D displays and cumbersome user interfaces. While the introduction of 3D printers has helped to make it easier for users to view and interact with 3D models more naturally, such printing can consume time and resources each time a design is iterated.

The present 3D viewport can be utilized much in the same way as a 3D printer by enabling the user to see and interact with a model in 3D in a natural manner, but without the printing wait time and expense. Faster iterations between model revisions can thus be achieved. The user can also utilize the viewport to view, manipulate, and move models between the viewport and monitor to provide increased 3D modeling flexibility and efficiency.

Figure 1:
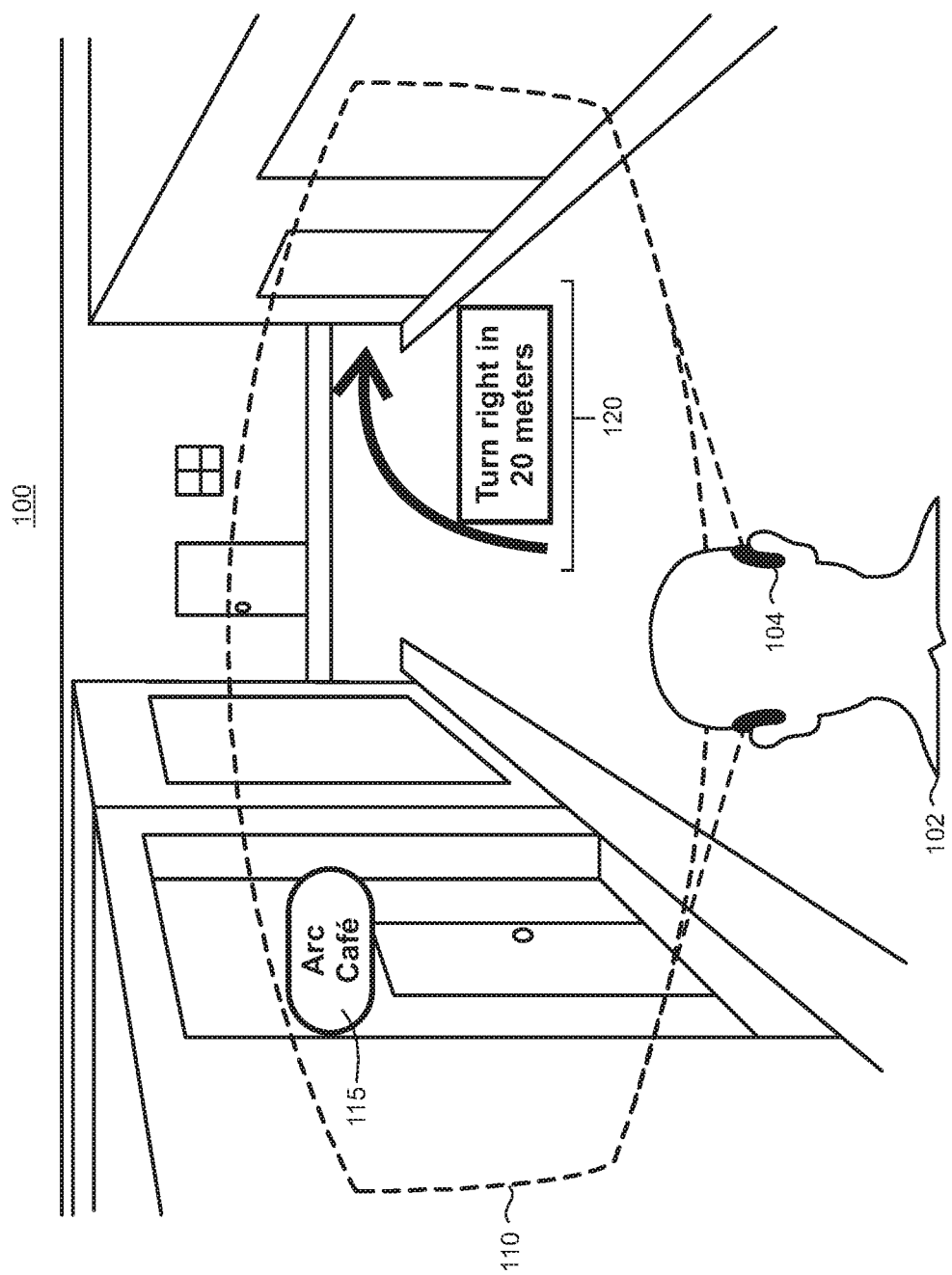
FIG. 1 shows an illustrative mixed-reality environment, a portion of which is rendered within the field of view of a user of a head-mounted display (HMD) device.

Turning now to the drawings, a mixed-reality or augmented-reality environment supported on an HMD device typically combines real world elements and computer-generated virtual elements to enable a variety of user experiences. In an illustrative example, as shown in FIG. 1, a user 102 can employ an HMD device 104 to experience a mixed reality environment 100 that is rendered visually on an optics display and may include audio and/or tactile/haptic sensations in some implementations. In this particular non-limiting example, the HMD device user is physically walking in a real world urban area that includes city streets with various buildings, stores, etc. The field of view (represented by the dashed area 110 in FIG. 1) of the cityscape provided by HMD device 104 changes as the user moves through the environment and the device can render virtual elements over the real world view. Here, the virtual elements include a tag 115 that identifies a business and directions 120 to a place of interest in the environment.

Figure 2:
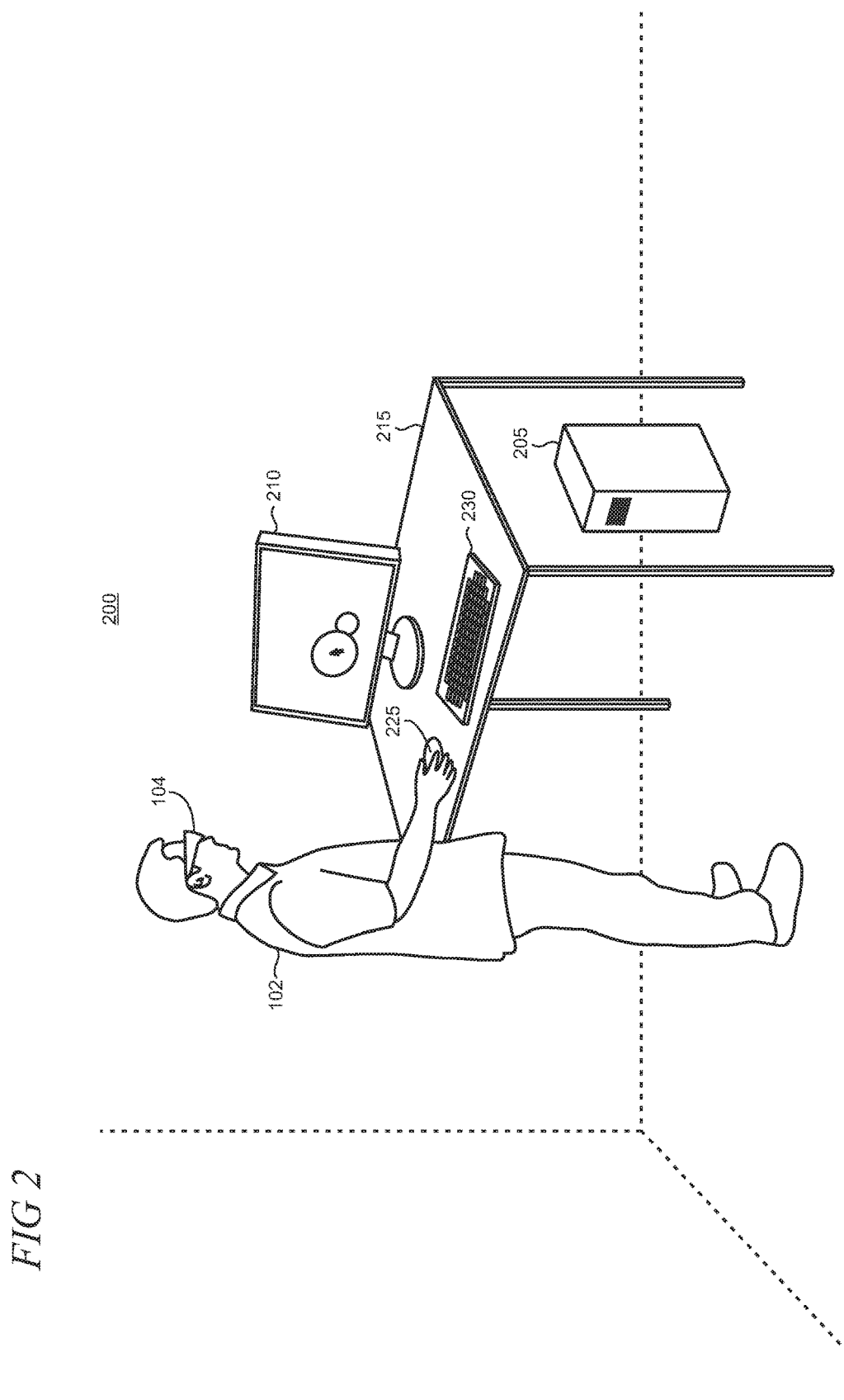
FIG. 2 shows an illustrative real world environment in which a user of an HMD device is located.
Figure 3:
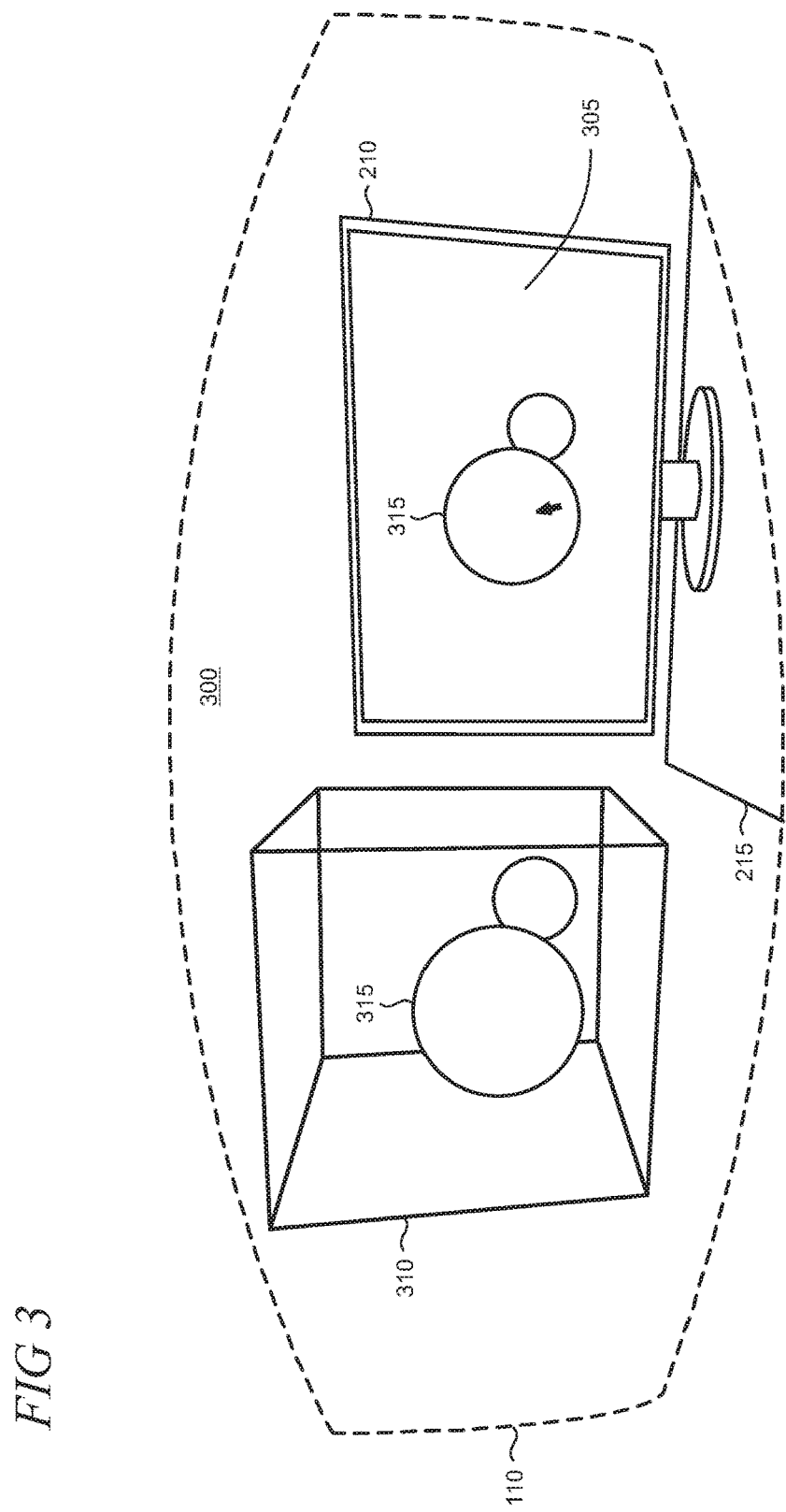
FIG. 3 shows an illustrative mixed-reality environment supporting a three-dimensional (3D) viewport displayed within a field of view of an HMD device.

In another illustrative mixed-reality scenario shown in FIG. 2, the physical, real world environment 200 that the user occupies when using the HMD device 104 can contain various real world objects including a PC 205, monitor 210, and work surface 215. The user may interact with the PC and monitor using a mouse 225, keyboard 230, and other user interfaces (not shown in FIG. 2) that may use voice (e.g., natural language or voice commands) or gestures in some cases. In this example, the monitor is incorporated into a mixed-reality environment 300, as shown in FIG. 3, and is visible to the user within the field of view 110 on the HMD device 104.

The user can typically interact with the PC 205 when viewing the monitor 210 in the mixed-reality environment in substantially the same way as in the real world environment. For example, the user can interact with objects, elements, windows, etc., that are supported on a desktop 305. The PC 205 supports an application that renders a 3D model 315 on the monitor 210. The HMD device 104 locates a virtual 3D viewport 310 that is interoperable with the 3D application so that a model 315 can be rendered in 3D in the viewport and in 2D on the monitor. The HMD device 104 can expose controls to enable the user to configure the viewport 310 in terms of its location, size, shape, and other characteristics in some implementations in order to tailor the viewport to particular needs. In this example, the user has configured the viewport 310 as a rectangular volume having an overall size that approximately matches that of the monitor 210 and has located the viewport to be adjacent to the monitor. The borders of the viewport are visible in this example, and in alternative implementations the borders can be rendered in different ways, in some cases under user control, using objects such as lines and broken lines with various treatments and effects such as colors, transparency, animation, and the like.

The user may typically consider the viewport 310 as a tool that extends the functionality of the 3D application by enabling a 3D model to be viewed and worked on in the particular rendering mode—whether in 2D on the monitor 210 or in 3D in the viewport—that is most suitable to the task at hand. Models can be conveniently moved between the monitor and viewport and vice versa as illustratively shown in FIG. 4. Here, the user can use the mouse cursor 405 to select and drag 3D objects from one rendering mode to the other. Alternative user actions can include copying/cutting and pasting, using voice or gestures to invoke transfers, and/or working through various menus and interfaces that may be exposed by the 3D application or HMD device.

Figure 4:
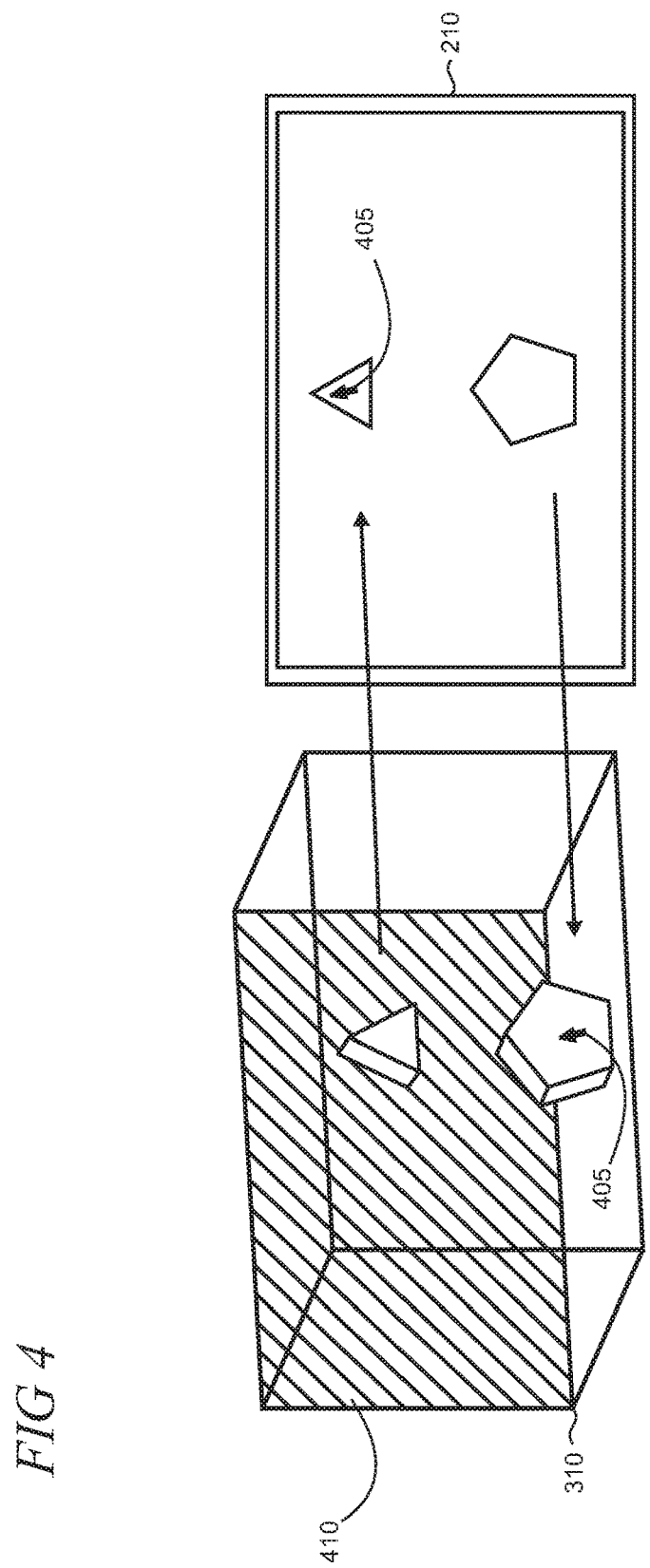
FIG. 4 shows 3D models being transferred between a virtual viewport and a real world monitor.

FIG. 4 also shows another feature of the viewport 310 in which the HMD device 104 can impose boundaries past which rendered virtual objects are clipped. The viewport thus functions as a 3D bounding box so that modeled objects will not spill out beyond their designated virtual space in the mixed-reality environment. In FIG. 4, the rear surface 410 of the viewport is shown in cross hatching to representatively indicate one of the six clipping planes of the rectangular viewport volume.

Figure 5:
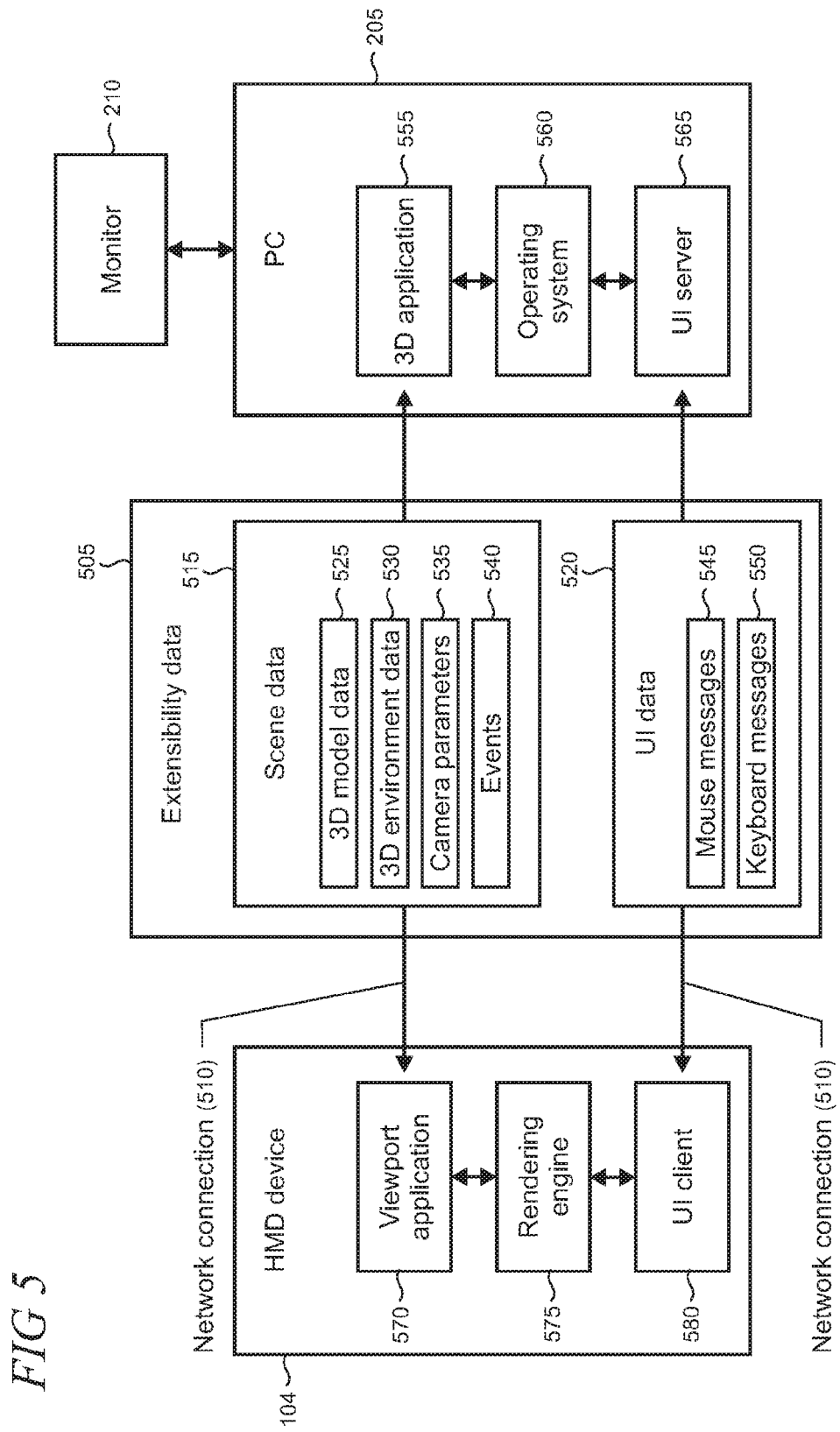
FIG. 5 shows extensibility data being exchanged between components instantiated on a personal computer (PC) and an HMD device to support a 3D viewport.

The PC 205 and HMD device 104 may be configured for interoperability to support the mixed-reality environment with the 3D viewport 310. FIG. 5 shows illustrative components that are instantiated on respective devices to enable extensibility data 505 to be shared over a network connection 510. The network connection 510 may be implemented, for example, using a wireless communication protocol such as Wi-Fi, Bluetooth™, or the like. The extensibility data 505 includes scene data 515 that describes the scene being rendered and user interface (UI) data 520 that describes user inputs using, for example, the mouse 225 and/or keyboard 230 (FIG. 2). The scene data 515 is typically generated by a 3D application 555 executing on the PC 205 that interfaces with a viewport application 570 that runs on the HMD device 104 and is coupled to a rendering engine 575 (which can be incorporated into a graphics processing unit (GPU) in some implementations) that renders the mixed-reality environment. The scene data 515 includes 3D model data 525 that describes geometry and similar aspects of a given model. The 3D environment data 530 describes lighting and other environmental conditions that can affect how a model appears when rendered. The camera parameters 535 may be associated with model transformations such as rotation, translations, and scaling. Data describing events 540 can also be included in the scene data. For example, events that pertain to a given model may be surfaced by the operating system, utilities, widgets, and the like.

A UI server 565 can provide UI data 520 to a UI client 580 on the HMD device. The UI data typically includes mouse messages 545 and keyboard messages 550. However, in alternative implementations, data relating to other user interfaces and input methodologies may be utilized.

FIG. 6 is a flowchart of an illustrative method 600 that may be implemented using the UI server 565 and UI client 580. In step 602, the location of the monitor within the real world environment is typically determined so that user inputs using, for example, keyboard and/or mouse can be suitably directed to the viewport or the PC and monitor. In some implementations, the monitor can be located using surface reconstruction (as described below) that can detect the monitor's edges and surfaces, stereoscopic imaging, or other suitable remote sensing technique. In alternative implementations, application code may be invoked, for example by an action of the user or using an automated process, that causes the monitor to display a pre-determined image or multiple images that the HMD device can use to recognize the monitor.

In order to direct keyboard inputs to the appropriate model being rendered on either the monitor or viewport, the HMD device 104 tracks the user's view position in which an imaginary ray is projected from the HMD device that corresponds to the user's line of sight (i.e., the direction in which the user is looking). Such tracking is described in greater detail below in the text accompanying FIGS. 7, 8, and 9. In step 605, the tracked view position is utilized to determine whether the user is interacting with a model rendered on the viewport or one that is rendered on the monitor so that keyboard events are appropriately directed. For example, the user may want to add descriptive text or dimensions to a model when shown in the viewport and then use various keyboard commands to look at the model in different orientations in the viewport. Typically, the tracked view positions can be utilized to reliably infer which device, monitor or viewport, is appropriate for keyboard event consumption.

For mouse inputs, in step 610 the UI server 565 tracks mouse movement through its connection with an operating system 560 on the PC 205. At decision block 615, if the mouse has not traveled beyond the limits of the screen of the monitor 210, then it is assumed that the user is still using the mouse on the desktop and control returns to step 610. If the mouse has traveled beyond the extent of the monitor, then in step 620 the UI server assumes control of the mouse and prevents mouse messages from propagating to other components executing on the PC 205.

In step 625, the UI server informs the UI client that the mouse is operating in the virtual world and it passes mouse messages such as mouse movements and user inputs (e.g., button clicks, scroll wheel actions, etc.) to the UI client. The UI client calculates an initial position for the cursor in the viewport based on exit point on the screen of the monitor in step 630, and computes the next position for the cursor based on changes in mouse movement in step 635. The cursor may be dynamically rendered in 3D using a size that is proportional to the cursor's distance from the user in the viewport. That is, it is typically rendered to be bigger when it is closer to the viewer and smaller when it is farther away. Such dynamic rendering according to distance can be beneficial as the user does not need to change his focal depth when looking at the cursor and any surrounding elements or objects in the viewport. The user is enabled to interact with the 3D model rendered in the viewport and the viewport itself (e.g., changing its configuration including location, size, and shape) using the mouse and keyboard among other inputs in step 640.

In step 645, the UI client calculates a ray between the next cursor position in the viewport and the current view position. If the calculated ray intersects the screen of the monitor, then the UI client informs the UI server that the cursor has transitioned back to the PC desktop in step 650 and reports the last cursor position to the mouse input server. The UI client discontinues rendering the cursor in the viewport and stops responding to mouse input events in step 655. The UI server calculates the cursor reentry position on the desktop using the last position reported by the UI client in step 660.

Figure 7:
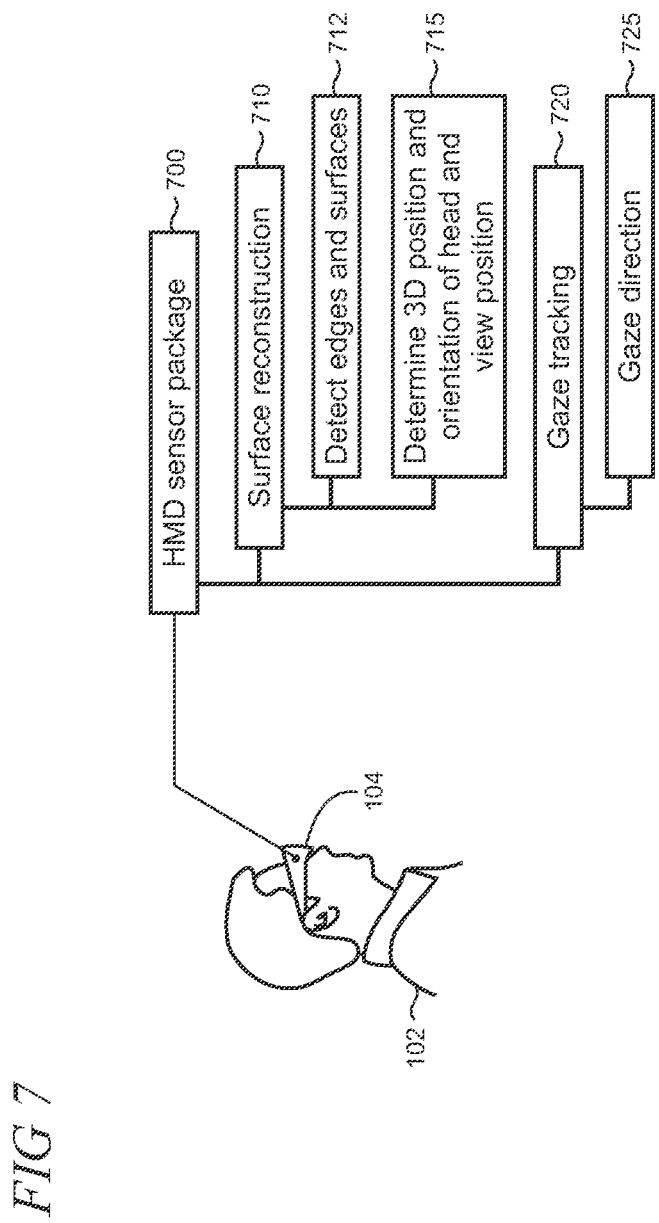
FIG. 7 shows illustrative data provided by an HMD sensor package.
Figure 8:
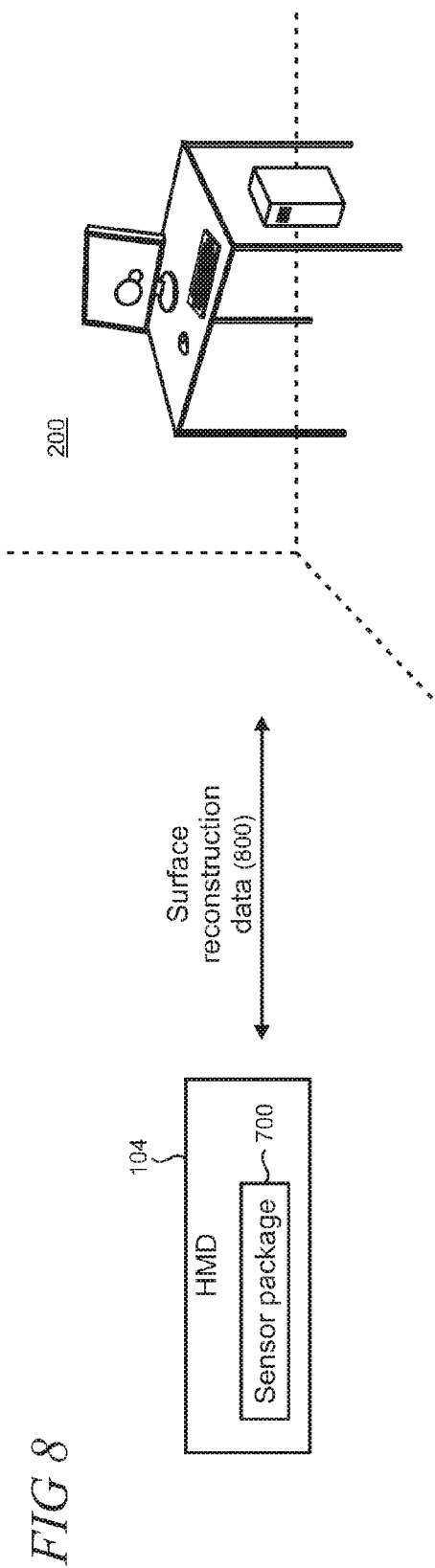
FIG. 8 depicts surface reconstruction data associated with real world objects being captured by an HMD device.

As shown in FIGS. 7 and 8, the HMD device 104 is configured with a sensor package 700 and exemplary sensors are described in more detail below. The sensor package 700 can support various functionalities including surface reconstruction 710. Surface reconstruction techniques enable detection of edges and surfaces (as indicated by reference numeral 712 in FIG. 7) and may be used to identify the location of various real world objects such as a monitor, work surface, people, etc., from data 800 that is collected about the physical environment 200 (as shown in FIG. 8). Surface reconstruction may also be utilized for head tracking to determine the 3D (three-dimensional) position and orientation of the user's head and view position within the environment (as indicated by reference numeral 715 in FIG. 7). In some implementations, the sensor package can support gaze tracking 720 to ascertain a direction of the user's gaze 725 which may be used along with the head position and orientation data when implementing the present viewport. In alternative implementations, depth data can be derived using suitable stereoscopic image analysis techniques.

Figure 9:
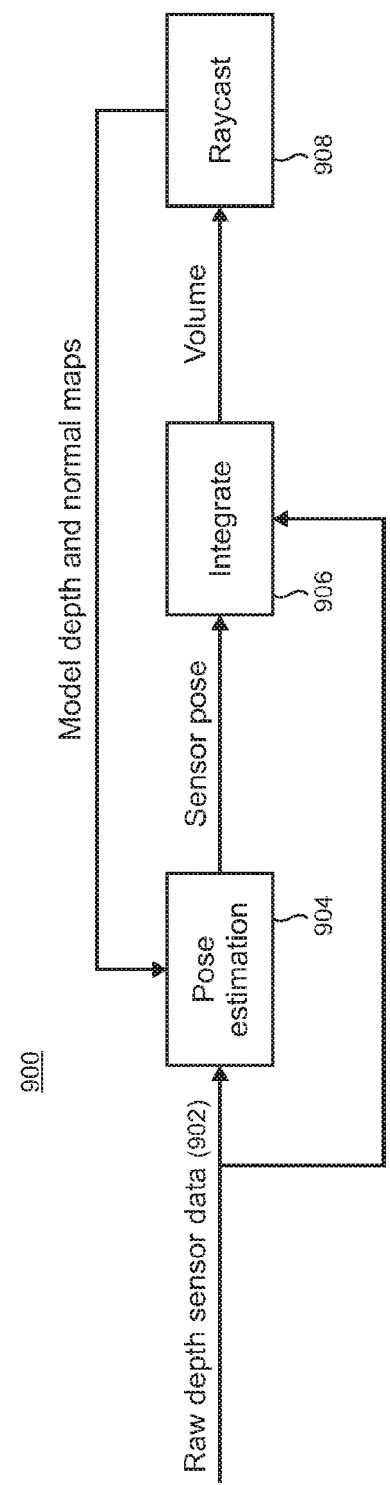
FIG. 9 shows a block diagram of an illustrative surface reconstruction pipeline.

FIG. 9 shows an illustrative surface reconstruction data pipeline 900 for obtaining surface reconstruction data for objects in the real world environment. It is emphasized that the disclosed technique is illustrative and that other techniques and methodologies may be utilized depending on the requirements of a particular implementation. Raw depth sensor data 902 is input into a 3D (three-dimensional) pose estimate of the sensor (block 904). Sensor pose tracking can be achieved, for example, using ICP (iterative closest point) alignment between the predicted surface and current sensor measurement. Each depth measurement of the sensor can be integrated (block 906) into a volumetric representation using, for example, surfaces encoded as a signed distance field (SDF). Using a loop, the SDF is raycast (block 908) into the estimated frame to provide a dense surface prediction to which the depth map is aligned. Thus, when the user 102 looks around the virtual world, surface reconstruction data associated with the real world environment 200 (FIG. 2) can be collected and analyzed to determine the user's head position and orientation within the environment. Along with gaze detection in some implementations, the head tracking enables the HMD device 104 to ascertain the user's view position.

Figure 10:
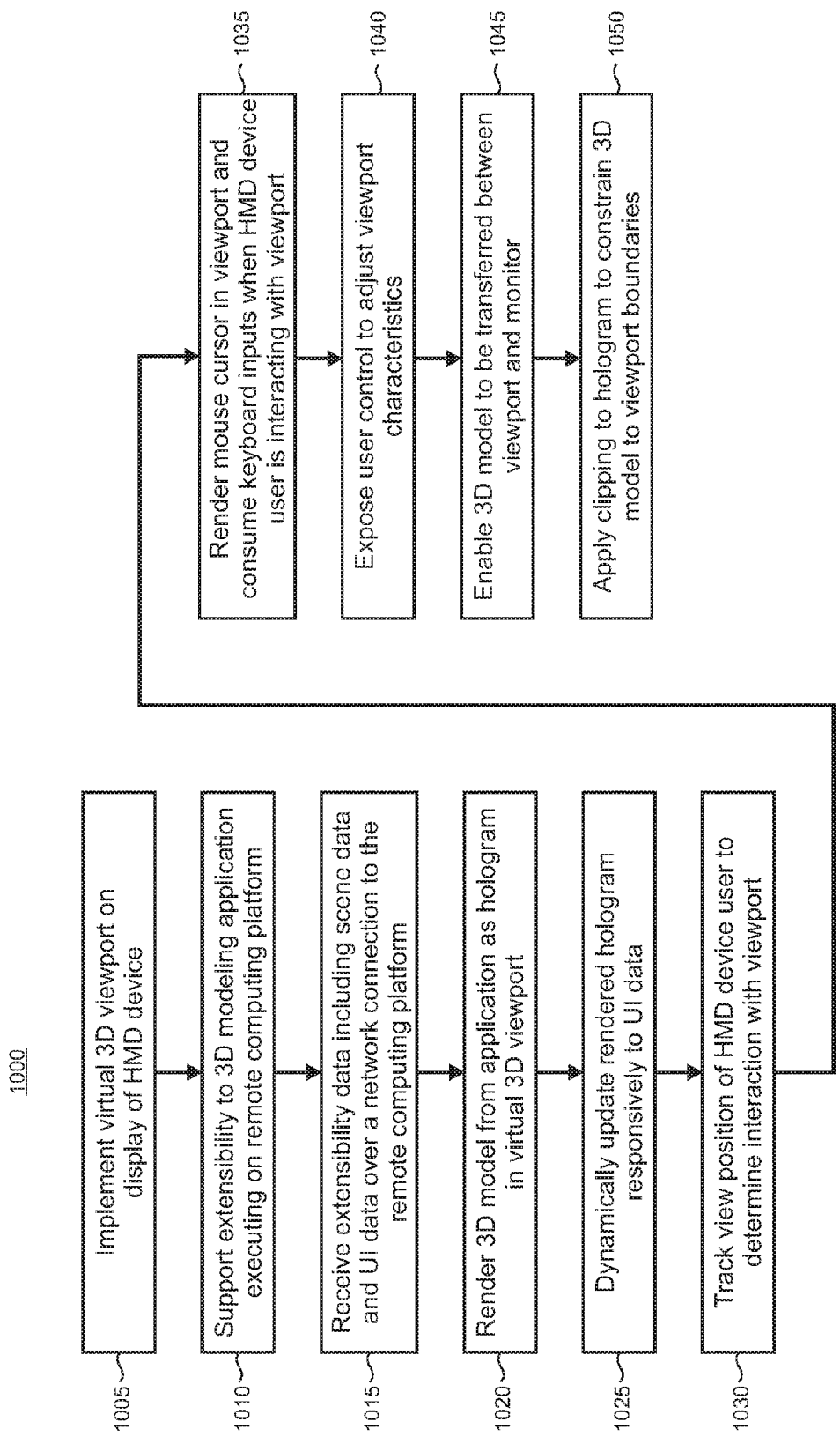
FIGS. 10, 11, and 12 are flowcharts of illustrative methods that may be performed, at least in part, using an HMD device.
Figure 11:
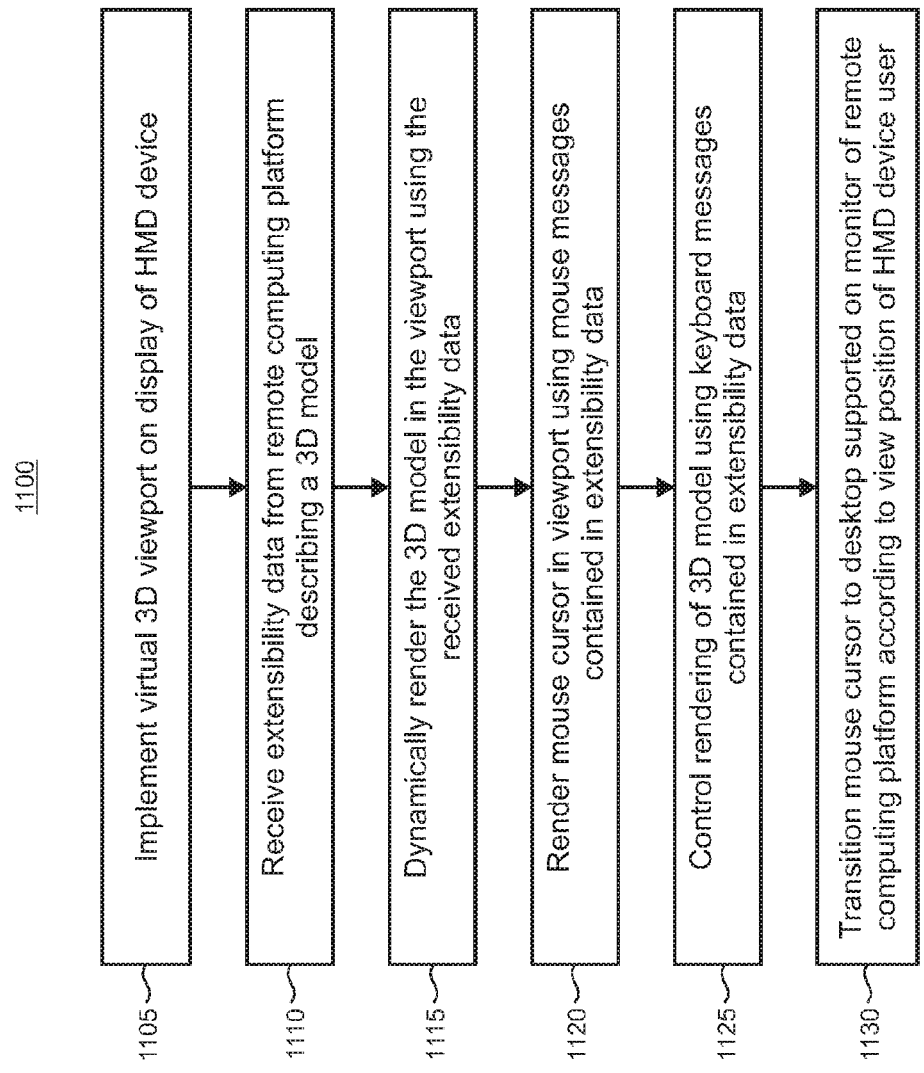
Figure 12:
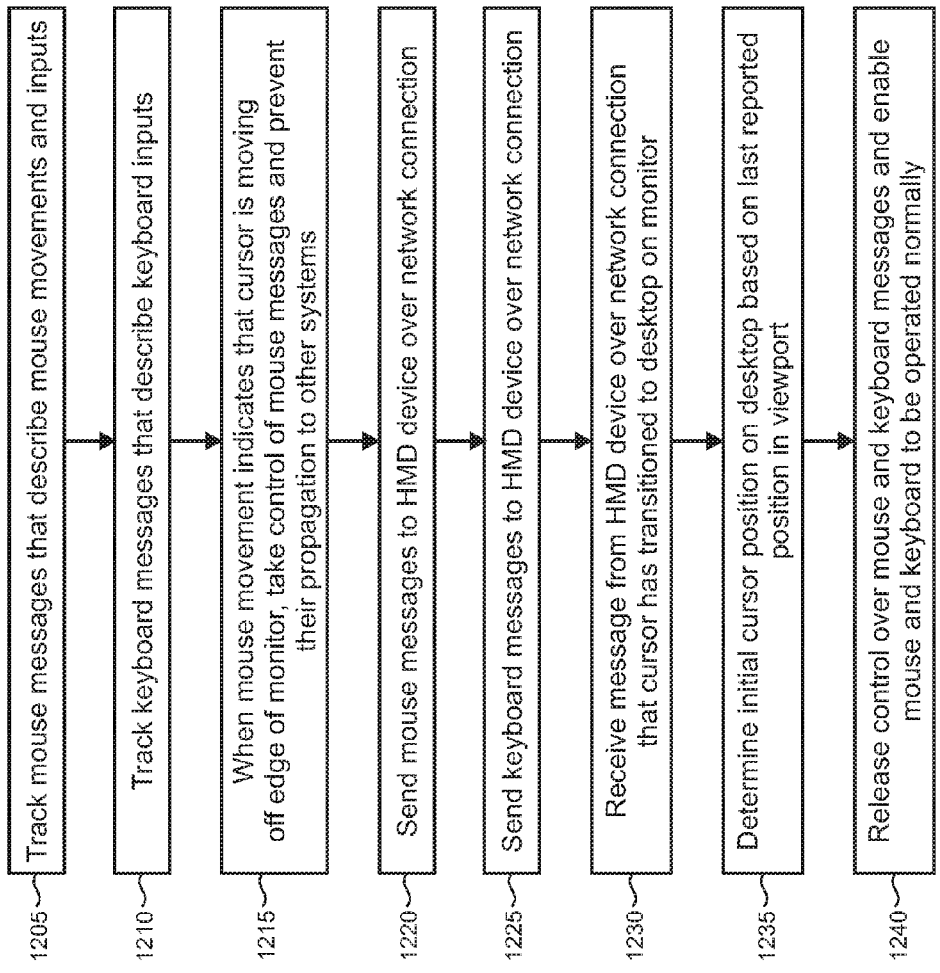

FIGS. 10 and 11 are flowcharts of illustrative methods that may be performed using the HMD device 104. FIG. 12 is a flowchart of an illustrative method that may be performed by a computing device such as PC 205. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005 of the illustrative method 1000 in FIG. 10, a virtual 3D viewport is implemented on a display of the HMD device 104. In step 1010, extensibility is supported to a 3D modeling application that executes on a remote computing platform such as a PC. In step 1015, extensibility data is received from the remote PC that can include scene data and UI data over a network. In step 1020, a 3D model supported by the remote application is rendered in the viewport as a hologram. The hologram can be dynamically updated in response to UI data in step 1025. The view position of the HMD user is tracked in step 1030 to determine user interaction with the viewport. In step 1035, a mouse cursor is rendered by the HMD device in the viewport and keyboard inputs are consumed when the HMD device user is interacting with the viewport.

In step 1040, the HMD device can expose a user control to adjust viewport characteristics such as location in the mixed-reality space, size, and shape. In step 1045, enablement is provided so that the user can transfer 3D models between the monitor and viewport. Clipping is applied to rendered holograms to constrain the 3D model to the boundaries of the viewport in step 1050.

In the illustrative method 1100 shown in FIG. 11, the HMD device 104 implements a virtual 3D viewport on its display in step 1105. In step 1110, extensibility data describing a 3D model is received from a remote computing platform that supports a 3D modeling application. The 3D model is dynamically rendered in the viewport using the extensibility data in step 1115. In step 1120, a mouse cursor is rendered in the viewport using the extensibility data. In step 1125, rendering of the 3D model is controlled using keyboard messages contained in the extensibility data. The mouse cursor is transitioned to a desktop supported by a monitor attached to the computing platform in step 1130 according to the view position of the HMD device user.

In the illustrative method 1200 shown in FIG. 12, the UI server tracks mouse messages that describe mouse movements and inputs in step 1205. In step 1210, keyboard messages that describe keyboard inputs are tracked. The UI server can have hooks into an operating system running on the computing platform in order to track the mouse and keyboard messages. If no UI client is detected, then the UI server typically just listens to the messages but takes no other actions. When the client is connected over the network connection, then the UI server can perform the tracking.

In step 1215, when the mouse movement indicates that the cursor is moving off the edge of the monitor, then the UI server takes control of the mouse messages and prevents them from propagating to other systems that are running on the device. Mouse and keyboard messages are sent to the HMD device over the network respectively in steps 1220 and 1225. In step 1230, the UI server receives a message from the UI client on the HMD device that the cursor has transitioned to the desktop on the monitor. In step 1235, an initial cursor position on the desktop is determined based on the last reported cursor position in the viewport. Control over the mouse and keyboard messages is released in step 1240, and the mouse and keyboard is enabled to be operated normally on the desktop.

Figure 13:
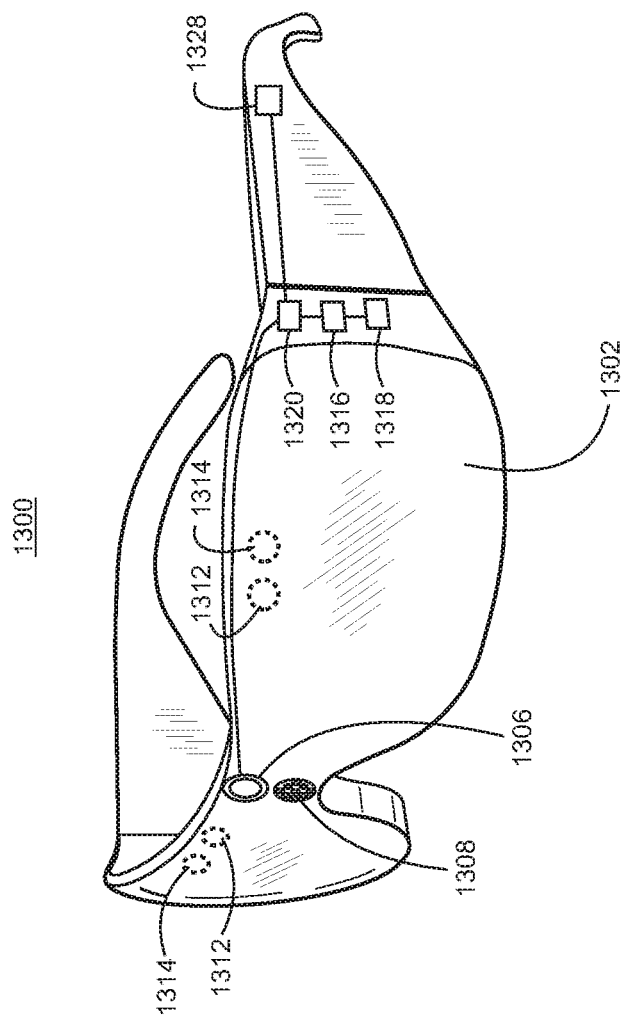
FIG. 13 is a pictorial view of an illustrative example of a virtual reality HMD device.
Figure 14:
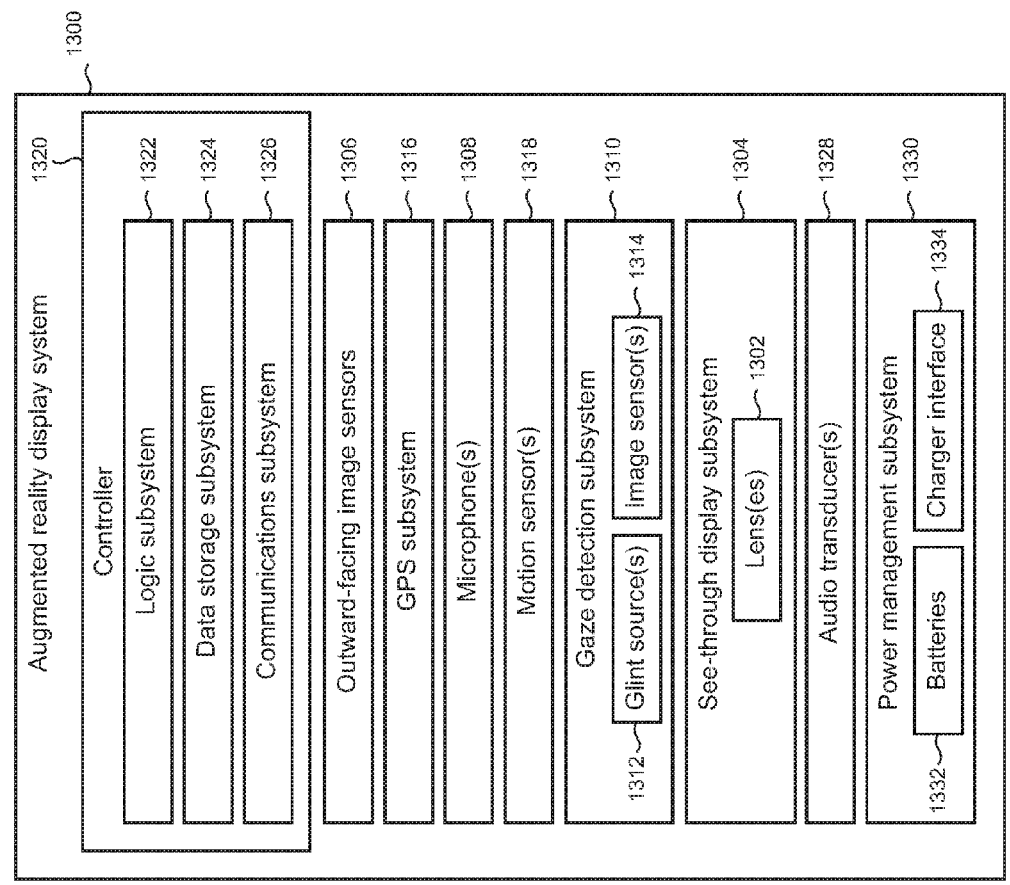
FIG. 14 shows a functional block diagram of an illustrative example of a virtual reality HMD device.
Figure 15:
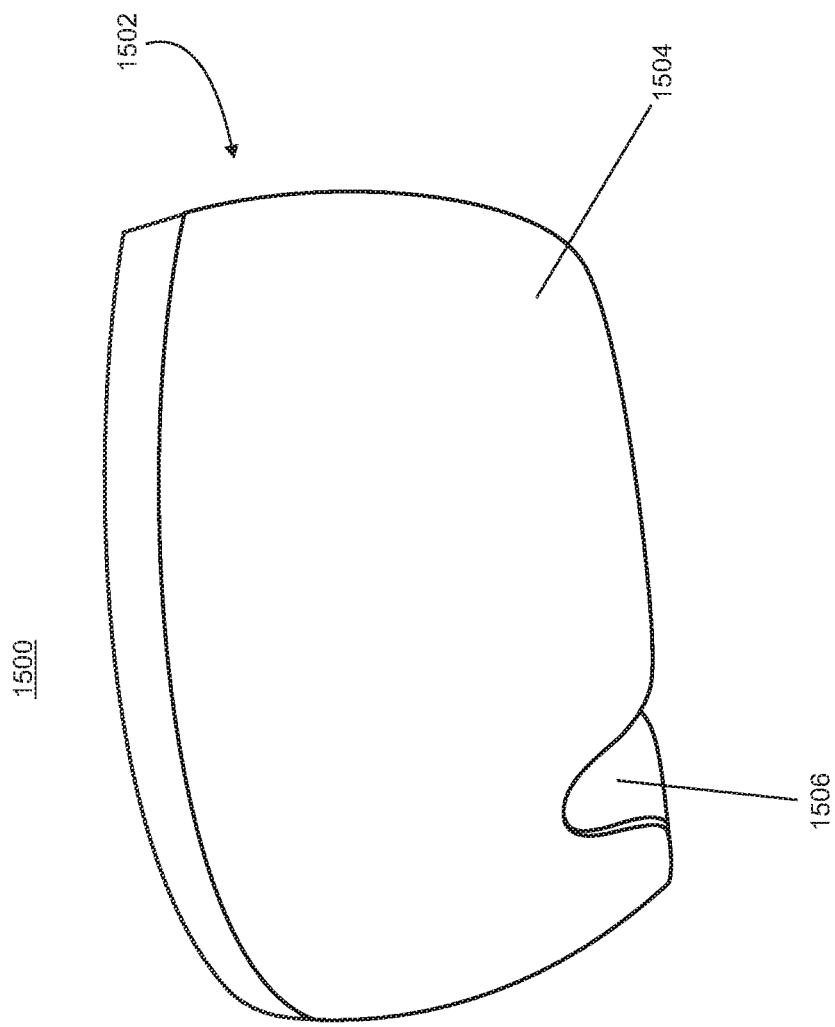
FIGS. 15 and 16 are pictorial front views of an illustrative sealed visor that may be used as a component of a virtual reality HMD device.
Figure 16:
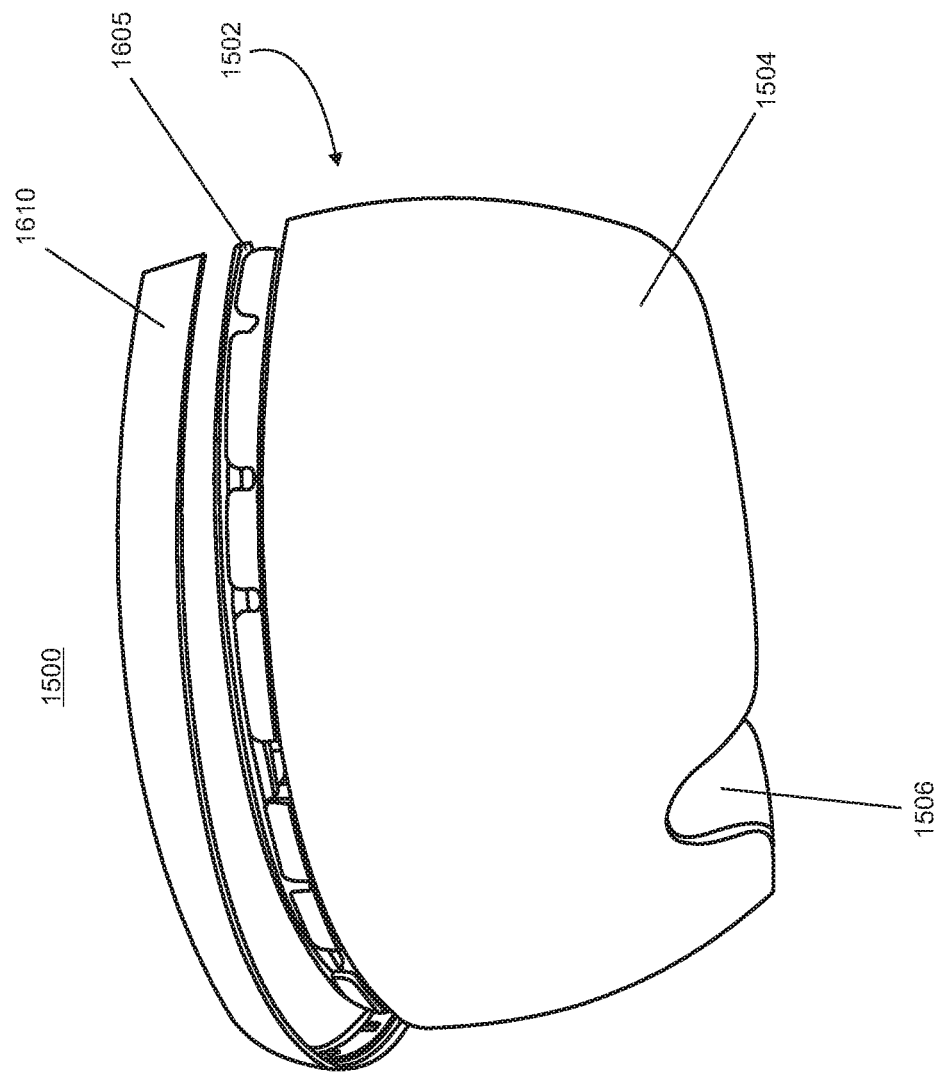

Turning now to various illustrative implementation details, a mixed reality display device according to the present arrangement may take any suitable form, including but not limited to near-eye devices such as the HMD device 104 and/or other portable/mobile devices. A see-through display may be used in some implementations while an opaque (i.e., non-see-through) display using a camera-based pass-through or outward facing sensor, for example, may be used in other implementations. FIG. 13 shows one particular illustrative example of a see-through, mixed reality display system 1300, and FIG. 14 shows a functional block diagram of the system 1300. Display system 1300 comprises one or more lenses 1302 that form a part of a see-through display subsystem 1304, such that images may be displayed using lenses 1302 (e.g. using projection onto lenses 1302, one or more waveguide systems incorporated into the lenses 1302, and/or in any other suitable manner). Display system 1300 further comprises one or more outward-facing image sensors 1306 configured to acquire images of a background scene and/or physical environment being viewed by a user, and may include one or more microphones 1308 configured to detect sounds, such as voice commands from a user. Outward-facing image sensors 1306 may include one or more depth sensors and/or one or more two-dimensional image sensors. In alternative arrangements, as noted above, a mixed reality display system, instead of incorporating a see-through display subsystem, may display mixed reality images through a viewfinder mode for an outward-facing image sensor.

The display system 1300 may further include a gaze detection subsystem 1310 configured for detecting a direction of gaze of each eye of a user or a direction or location of focus, as described above. Gaze detection subsystem 1310 may be configured to determine gaze directions of each of a user's eyes in any suitable manner. For example, in the illustrative example shown, a gaze detection subsystem 1310 includes one or more glint sources 1312, such as infrared light sources, that are configured to cause a glint of light to reflect from each eyeball of a user, and one or more image sensors 1314, such as inward-facing sensors, that are configured to capture an image of each eyeball of the user. Changes in the glints from the user's eyeballs and/or a location of a user's pupil, as determined from image data gathered using the image sensor(s) 1314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1310 may have any suitable number and arrangement of light sources and image sensors. In some implementations, the gaze detection subsystem 1310 may be omitted.

The display system 1300 may also include additional sensors. For example, display system 1300 may comprise a global positioning system (GPS) subsystem 1316 to allow a location of the display system 1300 to be determined. This may help to identify real world objects, such as buildings, etc. that may be located in the user's adjoining physical environment.

The display system 1300 may further include one or more motion sensors 1318 (e.g., inertial, multi-axis gyroscopic, or acceleration sensors) to detect movement and position/orientation/pose of a user's head when the user is wearing the system as part of an augmented-reality HMD device. Motion data may be used, potentially along with eye-tracking glint data and outward-facing image data, for gaze detection, as well as for image stabilization to help correct for blur in images from the outward-facing image sensor(s) 1306. The use of motion data may allow changes in gaze location to be tracked even if image data from outward-facing image sensor(s) 1306 cannot be resolved.

In addition, motion sensors 1318, as well as microphone(s) 1308 and gaze detection subsystem 1310, also may be employed as user input devices, such that a user may interact with the display system 1300 via gestures of the eye, neck and/or head, as well as via verbal commands in some cases. It may be understood that sensors illustrated in FIGS. 13 and 14 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1300 can further include a controller 1320 having a logic subsystem 1322 and a data storage subsystem 1324 in communication with the sensors, gaze detection subsystem 1310, display subsystem 1304, and/or other components through a communications subsystem 1326. The communications subsystem 1326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1324 may include instructions stored thereon that are executable by logic subsystem 1322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1300 is configured with one or more audio transducers 1328 (e.g., speakers, earphones, etc.) so that audio can be utilized as part of an augmented reality experience. A power management subsystem 1330 may include one or more batteries 1332 and/or protection circuit modules (PCMs) and an associated charger interface 1334 and/or remote power interface for supplying power to components in the display system 1300.

It may be appreciated that the depicted display devices 104 and 1300 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 15-19 show an illustrative alternative implementation for an augmented reality display system 1500 that may be used as a component of an HMD device. In this example, the system 1500 uses a see-through sealed visor 1502 that is configured to protect the internal optics assembly utilized for the see-through display subsystem. The visor 1502 is typically interfaced with other components of the HMD device (not shown) such as head mounting/retention systems and other subsystems including sensors, power management, controllers, etc., as illustratively described in conjunction with FIGS. 13 and 14. Suitable interface elements (not shown) including snaps, bosses, screws and other fasteners, etc. may also be incorporated into the visor 1502.

The visor includes see-through front and rear shields 1504 and 1506 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1605 as depicted in the partially exploded view in FIG. 16 in which a shield cover 1610 is shown as disassembled from the visor 1502.

The sealed visor 1502 can physically protect sensitive internal components, including an optics display subassembly 1702 (shown in the disassembled view in FIG. 17) when the HMD device is worn and used in operation and during normal handling for cleaning and the like. The visor 1502 can also protect the optics display subassembly 1702 from environmental elements and damage should the HMD device be dropped or bumped, impacted, etc. The optics display subassembly 1702 is mounted within the sealed visor in such a way that the shields do not contact the subassembly when deflected upon drop or impact.

Figure 17:
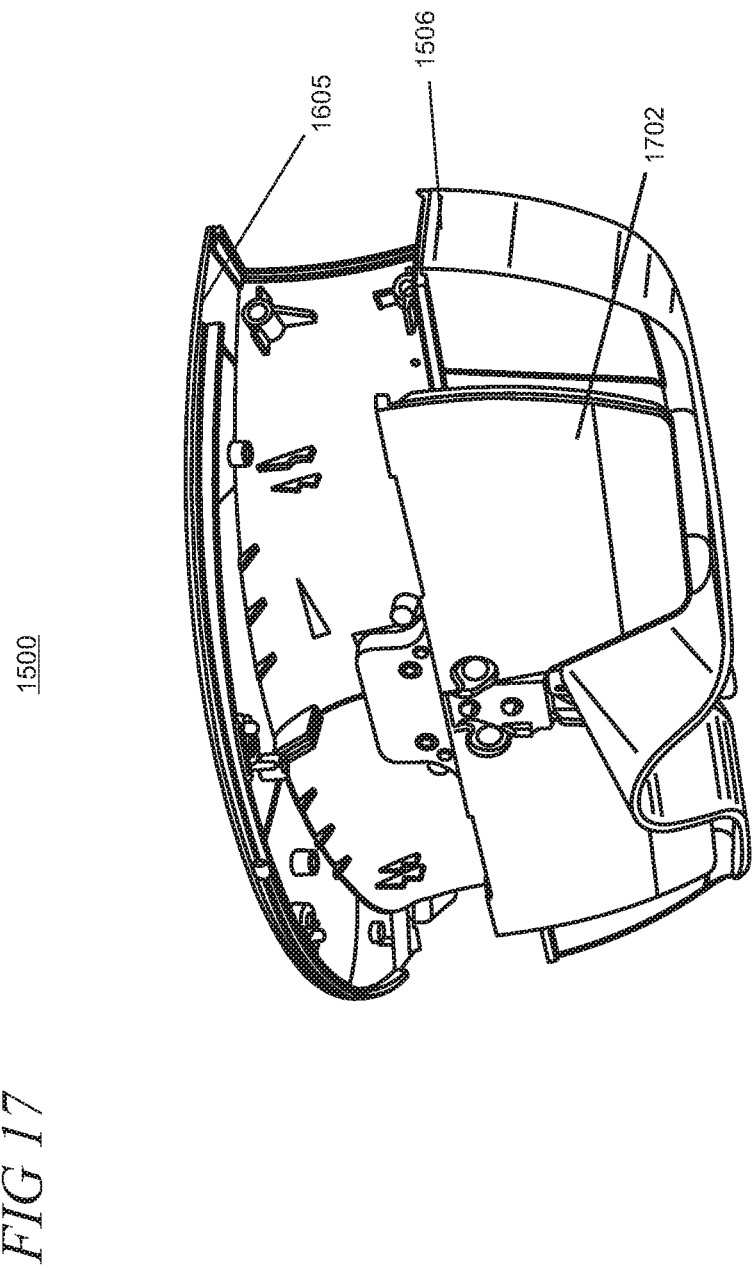
FIG. 17 shows a view of the sealed visor when partially disassembled.
Figure 18:
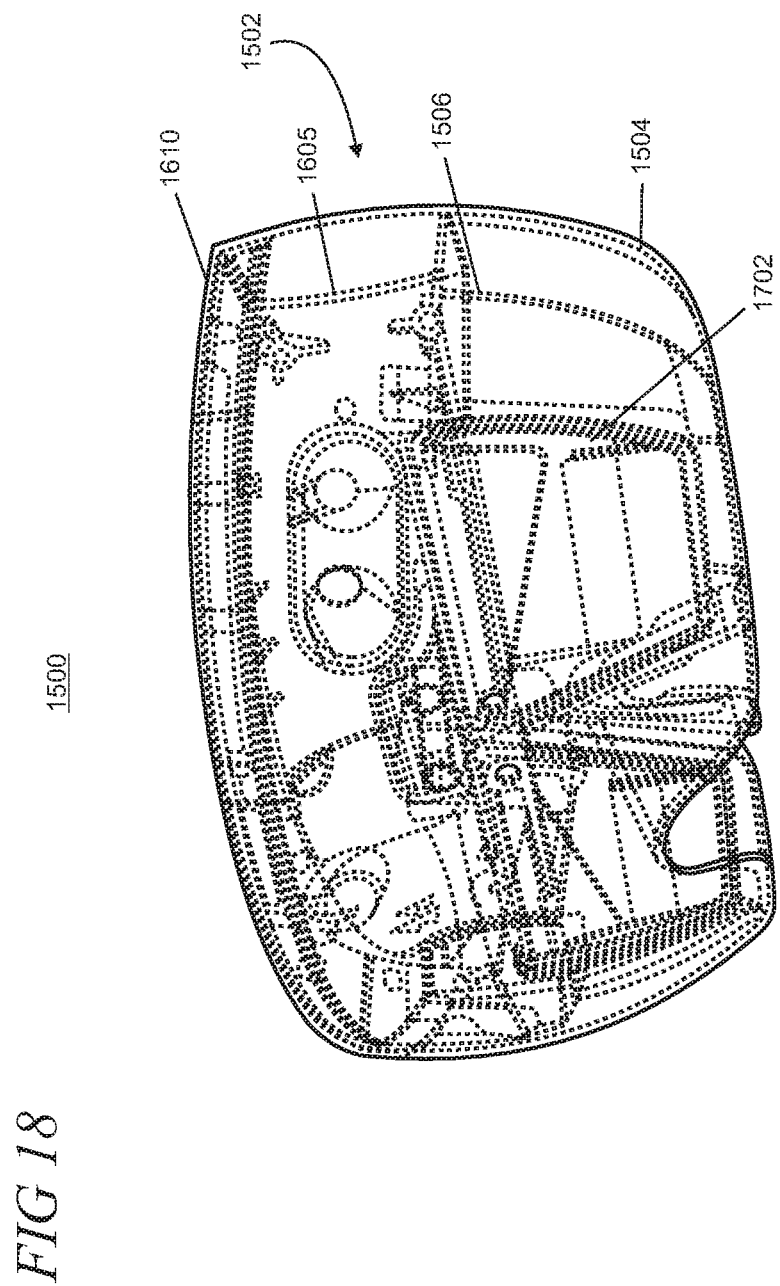
FIG. 18 shows a phantom line front view of the sealed visor.
Figure 19:
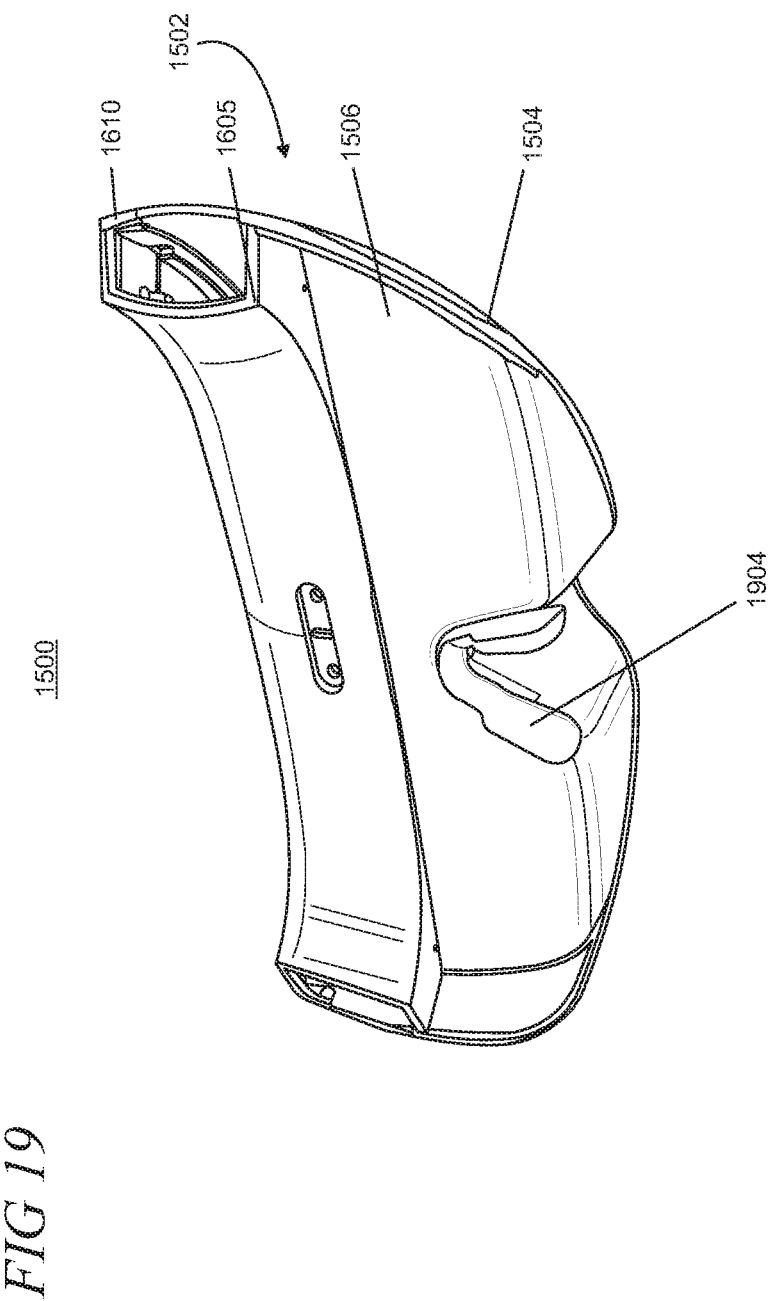
FIG. 19 shows a pictorial back view of the sealed visor.

As shown in FIGS. 17 and 19, the rear shield 1506 is configured in an ergonomically correct form to interface with the user's nose and nose pads 1904 (FIG. 19) and other comfort features can be included (e.g., molded-in and/or added-on as discrete components). The sealed visor 1502 can also incorporate some level of optical diopter curvature (i.e., eye prescription) within the molded shields in some cases.

Figure 20:
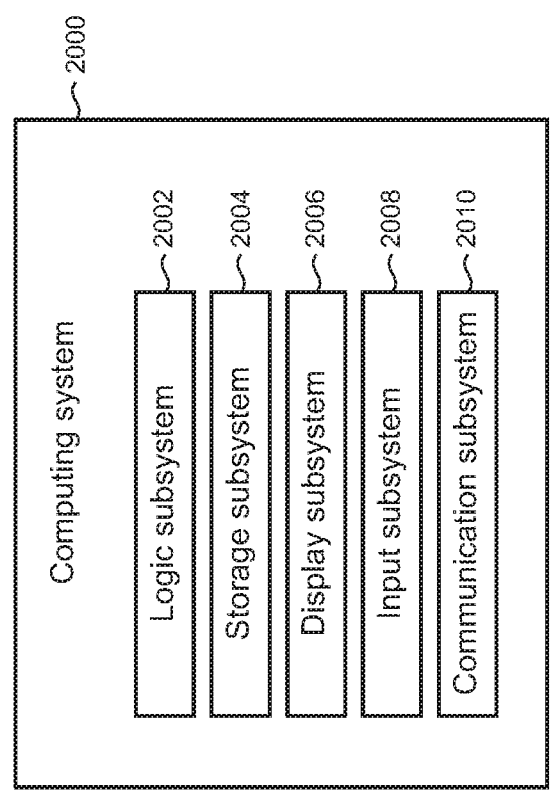
FIG. 20 shows an exemplary computing system.

FIG. 20 schematically shows a non-limiting embodiment of a computing system 2000 that can be used when implementing one or more of the configurations, arrangements, methods, or processes described above. The HMD device 104 may be one non-limiting example of computing system 2000. The computing system 2000 is shown in simplified form. It may be understood that virtually any computer architecture may be used without departing from the scope of the present arrangement. In different embodiments, computing system 2000 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 2000 includes a logic subsystem 2002 and a storage subsystem 2004. The computing system 2000 may optionally include a display subsystem 2006, an input subsystem 2008, a communication subsystem 2010, and/or other components not shown in FIG. 20.

The logic subsystem 2002 includes one or more physical devices configured to execute instructions. For example, the logic subsystem 2002 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 2002 may include one or more processors configured to execute software instructions. Additionally or alternatively, the logic subsystem 2002 may include one or more hardware or firmware logic machines configured to execute hardware or firmware instructions. The processors of the logic subsystem 2002 may be single-core or multi-core, and the programs executed thereon may be configured for sequential, parallel, or distributed processing. The logic subsystem 2002 may optionally include individual components that are distributed among two or more devices, which can be remotely located and/or configured for coordinated processing. Aspects of the logic subsystem 2002 may be virtualized and executed by remotely accessible, networked computing devices configured in a cloud-computing configuration.

The storage subsystem 2004 includes one or more physical devices configured to hold data and/or instructions executable by the logic subsystem 2002 to implement the methods and processes described herein. When such methods and processes are implemented, the state of the storage subsystem 2004 may be transformed—for example, to hold different data.

The storage subsystem 2004 may include removable media and/or built-in devices. The storage subsystem 2004 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 2004 may include volatile, nonvolatile, dynamic, static, read/write, read-only, random-access, sequential-access, location-addressable, file-addressable, and/or content-addressable devices.

It may be appreciated that the storage subsystem 2004 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 2002 and of the storage subsystem 2004 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 2006 may be used to present a visual representation of data held by storage subsystem 2004. This visual representation may take the form of a graphical user interface (GUI). As the present described methods and processes change the data held by the storage subsystem, and thus transform the state of the storage subsystem, the state of the display subsystem 2006 may likewise be transformed to visually represent changes in the underlying data. The display subsystem 2006 may include one or more display devices utilizing virtually any type of technology. Such display devices may be combined with logic subsystem 2002 and/or storage subsystem 2004 in a shared enclosure in some cases, or such display devices may be peripheral display devices in others.

When included, the input subsystem 2008 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 2010 may be configured to communicatively couple the computing system 2000 with one or more other computing devices. The communication subsystem 2010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2000 to send and/or receive messages to and/or from other devices using a network such as the Internet.

Figure 21:
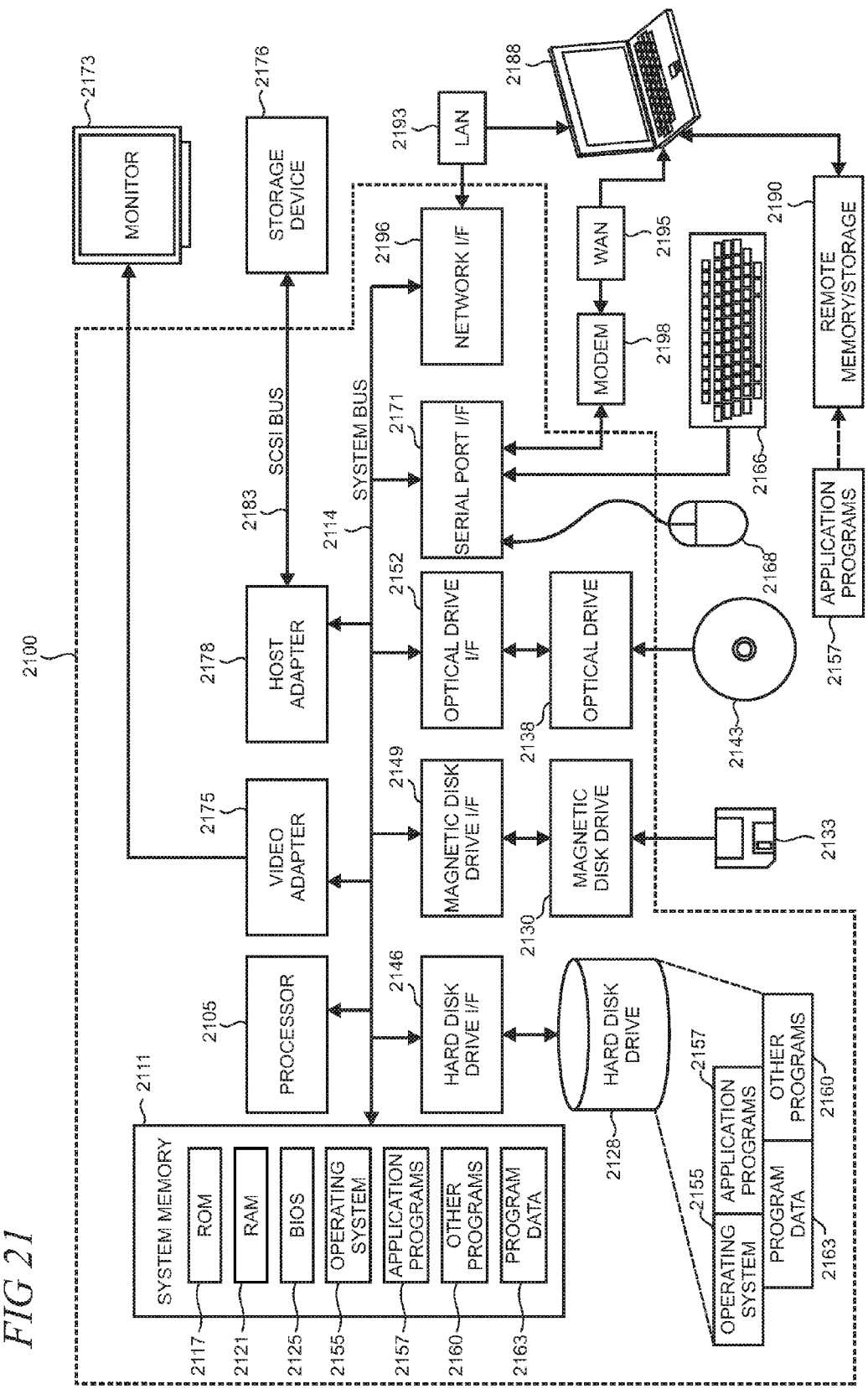
FIG. 21 is a simplified block diagram of an illustrative computer system such as a personal computer (PC) that may be used in part to implement the present 3D mixed-reality viewport.

FIG. 21 is a simplified block diagram of an illustrative computer system 2100 such as a PC, client machine, or server with which the present viewport may be implemented. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present viewport. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2133, optical disk 2143, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, personal computers typically include other peripheral output devices (not shown), such as speakers and printers. The illustrative example shown in FIG. 21 also includes a host adapter 2178, a Small Computer System Interface (SCSI) bus 2183, and an external storage device 2176 connected to the SCSI bus 2183.

The computer system 2100 is operable in a networked environment using logical connections to one or more remote computers, such as a remote computer 2188. The remote computer 2188 may be selected as another personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of the present viewport.

Various exemplary embodiments of the present three-dimensional mixed reality viewport are now presented by way of illustration and not as an exhaustive list of all embodiments. An example includes a head mounted display (HMD) device operable by a user in a physical environment, comprising: one or more processors; a sensor package; a display configured for rendering a mixed reality environment to the user, a view position of the user for the rendered mixed-reality environment being variable depending at least in part on a pose of the user's head in the physical environment; and one or more memory devices storing computer-readable instructions which, when executed by the one or more processors, perform a method comprising the steps of: implementing a three-dimensional (3D) virtual viewport on the display, supporting extensibility to a 3D modeling application executing on a remote computing platform, the application supporting a 3D model, and rendering the 3D model as a hologram in the viewport.

In another example, the HMD further includes a network interface and receiving extensibility data from the remote computing platform over the network interface, the extensibility data describing the 3D model and user inputs at the remote computing platform. In another example, the HMD further includes dynamically updating the rendered hologram in the viewport responsively to the user inputs. In another example, the HMD further includes obtaining sensor data from the sensor package, the sensor data associated with a physical environment adjoining a user of the HMD device; using the sensor data, reconstructing a geometry of the physical environment including any real world object located therein; and using the reconstructed geometry to determine a location of a monitor that is coupled to the computing platform within the physical environment. In another example, the sensor data includes depth data and the sensor data is generated using a depth sensor and surface reconstruction techniques are applied to reconstruct the physical environment geometry. In another example, the HMD further includes tracking the user's head in the physical environment using the reconstructed geometry to determine the view position, rendering a mouse cursor in the viewport when user input causes the mouse cursor to move off a desktop supported by the monitor, and consuming keyboard inputs when a ray projected from the view position intersects with the viewport. In another example, the HMD further includes discontinuing the rendering of the mouse cursor in the viewport when the projected ray indicates that the mouse cursor has transitioned to a desktop supported by the monitor. In another example, the HMD further includes providing a control to the user to control viewport characteristics including at least one of viewport location in the mixed-reality environment, viewport size, or viewport shape. In another example, the HMD further includes enabling the 3D model to be transferred between the desktop and viewport using a mouse or keyboard. In another example, the HMD further includes clipping the 3D model to constrain the 3D model to an extent of the viewport.

A further examples includes a method performed by a head mounted display (HMD) device supporting a mixed-reality environment including virtual objects and real objects, the method comprising: implementing a virtual three-dimensional (3D) viewport on a display of the HMD device; receiving extensibility data from a remote computing platform over a network connection, the extensibility data including scene data describing a 3D model supported by an application executing on the computing platform, and further including user interface (UI) data describing user inputs to the computing platform; and dynamically rendering the 3D model in the viewport using the received extensibility data.

In another example, the method further includes rendering a mouse cursor in the viewport based on mouse messages included in the UI data. In another example, the method further includes controlling rendering of the 3D model in the viewport using keyboard messages included in the UI data. In another example, the scene data includes at least one of 3D model data, environmental data, or camera parameters. In another example, the method further includes utilizing sensor data to determine a view position of a user of the HMD device and transitioning the cursor back to a desktop supported by a monitor coupled to the computing platform when a ray projected from the view position intersects the monitor. In another example, the method further includes modeling a physical environment in which the HMD device is located using a surface reconstruction data pipeline that implements a volumetric method creating multiple overlapping surfaces that are integrated and using the modeled physical environment at least in part to determine the view position or to determine a location of a monitor that is coupled to the computing platform within the physical environment.

A further example includes a computing device, comprising: one or more processors; an interface to a monitor, the monitor displaying a desktop; a mouse interface for connecting to a mouse and receiving signals from the mouse indicating mouse movement and inputs to mouse controls from a user of the computing device; a keyboard interface for connecting to a keyboard and receiving signals from the keyboard indicating keyboard inputs from the user; a network interface for communicating with a remote head mounted display (HMD) device over a network connection; and one or more memory devices storing computer-readable instructions which, when executed by the one or more processors implement a three-dimensional (3D) modeling application and a user interface (UI) server configured for tracking mouse messages that describe the mouse movements and inputs, tracking keyboard messages that describe the keyboard inputs, when a mouse movement indicates that a cursor associated with the mouse is moving beyond an edge of the monitor, taking control of the mouse messages and preventing propagation of the mouse messages to systems operating on the computing device, sending the mouse messages to the HMD device over the network connection, and sending the keyboard messages to the HMD device over the network connection.

In another example, the HMD device is configured for i) identifying a location of the monitor within a physical environment using one of surface reconstruction or observing a pre-determined, trackable image that is displayed on the monitor, and ii) supporting a mixed-reality environment on an optical display, the mixed-reality environment including a virtual 3D viewport into which hologram-based models from the 3D modeling application may be rendered. In another example, the computing device further includes tracking the mouse messages and keyboard messages by interacting with an operating system executing on the computing device. In another example, the computing device further includes receiving a message from the HMD device that the mouse cursor has transitioned to the desktop and calculating an initial cursor position on the desktop using a last reported position of the mouse cursor in the viewport.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A head mounted display (HMID) device operable by a user in a physical environment, comprising:
   one or more processors;
   a sensor package configured to dynamically provide sensor data used to determine a pose of the user's head in the physical environment;
   a network connection configured to support an exchange of extensibility data between the HID device and a remote computing device, in which the remote computing device executes an application that renders a three-dimensional (3D) model on a two-dimensional (2D) desktop;
   a see-through display configured for rendering a mixed-reality environment to the user, a view position of the user for the rendered mixed-reality environment being variable depending at least in part on the determined user head pose; and
   one or more memory devices storing computer-readable instructions which, when executed by the one or more processors, cause the HMID device to:
   determine user head pose in the physical environment using the sensor data,
   implement a 3D virtual viewport on the see-through display,
   exchange extensibility data between the HMID device and the remote computing device, the extensibility data including scene data for the 3D model and user interface data for the 3D model, and wherein the extensibility data is configured to support multiple different rendering modes including 2D rendering on the desktop and 3D rendering on the viewport, in which the desktop and viewport each utilize the exchanged extensibility data to facilitate rendering of the 3D model in the different respective 2D rendering and 3D rendering supported by the desktop and the viewport, respectively,
   selectively utilize one or more of the scene data or interface data to render the 3D model as a hologram in the viewport based on the view position,
   enable user interaction with the hologram in the viewport, and
   operate the see-through display based on the view position to enable user interaction with the 3D model on the desktop.

2. The HMD device of claim 1 further including providing a control to the user to control viewport characteristics including at least one of viewport location in the mixed-reality environment, viewport size, or viewport shape.

3. The HMD device of claim 1 further including clipping the 3D model to constrain the 3D model to an extent of the viewport.

4. The HMD device of claim 1 further including a rendering engine configured to render the hologram in the viewport, and in which the executed instructions further cause the HMD device to utilize the exchanged extensibility data in the rendering engine.

5. The HMD device of claim 1 in which the executed instructions further cause the HMD device to consume user inputs to the remote computing device based on the view position.

6. The HMD device of claim 1 in which the executed instructions further cause the HMD device to update the extensibility data based on user interactions with the hologram in the viewport, in which the updated extensibility data is utilized by the remote computing device to render the 3D model on the desktop.

7. The HMD of claim 1 further including
   obtaining sensor data from the sensor package, the sensor data associated with a physical environment adjoining a user of the HMD device;
   using the sensor data, reconstructing a geometry of the physical environment including any real world object located therein; and
   using the reconstructed geometry to determine a location of a monitor that is coupled to the remote computing device within the physical environment, wherein the monitor is configured to render the 2D desktop.

8. The HMD device of claim 7 further including tracking the user's head in the physical environment using the reconstructed geometry to determine the view position, rendering a mouse cursor in the viewport when user input causes the mouse cursor to move off the 2D desktop supported by the monitor coupled to the remote computing device, and consuming keyboard inputs when a ray projected from the view position intersects with the viewport.

9. The HMD device of claim 8 further including discontinuing the rendering of the mouse cursor in the viewport when the projected ray indicates that the mouse cursor has transitioned to the desktop supported by the monitor.

10. The HMD device of claim 1 further including enabling the 3D model to be transferred between the 2D desktop and the viewport using a mouse or keyboard that is coupled to the remote computing device.

11. The HMD device of claim 1 in which the sensor data includes depth data and further including generating the sensor data using a depth sensor and wherein the executed instructions further cause the HMD to apply surface reconstruction techniques to determine the user head pose.

12. A method performed by a head mounted display (IMD) device supporting a mixed-reality environment including virtual objects and real objects, the method comprising:

implementing a three-dimensional (3D) virtual viewport on a display of the HMD device;

receiving extensibility data from a remote computing device over a network connection, the extensibility data including scene data describing a 3D model supported by an application executing on the computing device, the computing device being associated with a monitor that supports a desktop, and further including user interface (UI) data describing user inputs to the computing device, and wherein the extensibility data is configured to support multiple different rendering modes including two-dimensional (2D) rendering on the desktop and 3D rendering on the viewport, in which the desktop and viewport each utilize the exchanged extensibility data to facilitate rendering of the 3D model in the different respective 2D rendering and 3D rendering supported by the desktop and the viewport, respectively; and dynamically rendering the 3D model in the viewport using the received extensibility data.

13. The method of claim 12 further including rendering a mouse cursor in the 3D virtual viewport based on mouse messages included in the UI data.

14. The method of claim 12 further including controlling rendering of the 3D model in the viewport using keyboard messages included in the UI data.

15. The method of claim 14 further including utilizing sensor data to determine a view position of a user of the HMD device and transitioning a cursor back to the desktop supported by a monitor coupled to the computing device when a ray projected from the view position intersects the monitor.

16. The method of claim 15 further including modeling a physical environment in which the HMD device is located using a surface reconstruction data pipeline that implements a volumetric method creating multiple overlapping surfaces that are integrated and using the modeled physical environment at least in part to determine the view position or to determine a location of the monitor that is coupled to the computing device within the physical environment.

17. The method of claim 12 in which the scene data includes at least one of 3D model data, environmental data, or camera parameters.

18. A computing device, comprising:

one or more processors;

an interface to a monitor, the monitor displaying a two-dimensional (2D) desktop;

a mouse interface for connecting to a mouse and receiving signals from the mouse indicating mouse movement and inputs to mouse controls from a user of the computing device;

a keyboard interface for connecting to a keyboard and receiving signals from the keyboard indicating keyboard inputs from the user;

a network interface for communicating with a remote head mounted display (HMD) device over a network connection, the HMD device being configured to support a three-dimensional (3D) virtual viewport; and one or more memory devices storing computer-readable instructions which, when executed by the one or more processors implement a three-dimensional (3D) modeling application and a user interface (UI) server configured for tracking mouse messages that describe the mouse movements and inputs, tracking keyboard messages that describe the keyboard inputs, when a mouse movement indicates that a cursor associated with the mouse is moving beyond an edge of the monitor, taking control of the mouse messages and preventing propagation of the mouse messages to systems operating on the computing device, sending the mouse messages to the HMD device over the network connection, sending the keyboard messages to the HMD device over the network connection, and sending extensibility data to the HMD device over the network, the extensibility data including scene data describing a 3D model supported by an application executing on the computing device, and wherein the extensibility data is configured to support multiple different rendering modes including 2D rendering on the desktop and 3D rendering on the viewport, in which the desktop and viewport each utilize the exchanged extensibility data to facilitate rendering of the 3D model in the different respective 2D rendering and 3D rendering supported by the desktop and the viewport, respectively.

19. The computing device of claim 18 further including tracking the mouse messages and keyboard messages by interacting with an operating system executing on the computing device.

20. The computing device of claim 18 further including receiving a message from the HMD device that the mouse cursor has transitioned to the desktop and calculating an initial cursor position on the desktop using a last reported position of the mouse cursor in the viewport.

* * * * *